United States Patent [19]

Funk

[11] 4,419,654

[45] Dec. 6, 1983

[54] TRACTOR DATA CENTER

[75] Inventor: Robert C. Funk, Liberty, Ill.

[73] Assignee: Dickey-john Corporation, Auburn, Ill.

[21] Appl. No.: 284,571

[22] Filed: Jul. 17, 1981

[51] Int. Cl.³ .................................................. B60Q 1/00

[52] U.S. Cl. ................................... 340/52 R; 180/197; 303/100; 324/161; 340/62; 361/238; 361/242

[58] Field of Search ...................... 340/52 R, 52 B, 62, 340/669; 180/197; 303/94, 100, 111; 324/161; 361/238, 242; 364/424, 426

[56] References Cited

U.S. PATENT DOCUMENTS

| | | | |
|---|---|---|---|
| 3,874,743 | 4/1975 | Fleischer et al. | 340/52 B X |
| 3,966,265 | 6/1976 | Taylor et al. | 340/52 B X |
| 4,086,563 | 4/1978 | Bachman | 340/52 B |
| 4,109,234 | 8/1978 | Davis | 340/52 B |
| 4,114,957 | 9/1978 | Eichhorst | 361/242 X |
| 4,125,825 | 11/1978 | Takeuchi et al. | 340/52 B |
| 4,347,569 | 8/1982 | Allen, Jr. et al. | 180/197 X |
| 4,354,173 | 10/1982 | Kuhn et al. | 340/52 R |

*Primary Examiner*—David L. Trafton

*Assistant Examiner*—Joseph Nowicki

*Attorney, Agent, or Firm*—Trexler, Bushnell & Wolters, Ltd.

[57] ABSTRACT

A monitoring apparatus for a vehicle such as a tractor comprises a console including controls and a control circuit for calculating wheel slippage of at least one drive wheel of the vehicle and responsive to engine RPM of the vehicle and to the rotational speed of the drive wheel for calculating a predetermined relationship therebetween. The control circuit is also responsive to actuation of the controls for setting the calculated relationship equal to a predetermined reference value when there is substantially no load on the vehicle, and hence minimum slippage of the drive wheel, in each of a plurality of ranges of gear ratios of the vehicle, thereby calibrating the control circuit to calculate wheel slippage for each of these ranges of gear ratios. The console also mounts an observable indicator and the control circuit also calculates other variables such as vehicle speed and engine RPM and actuates the observable indicator when the calculated values deviate from preselected values.

17 Claims, 3 Drawing Figures

LCD DRIVER 150
LCD DRIVER 152
Q7
Q1
Q32
DI
CLK
Q16
Q17
DO
DIN
+V
R/R
INT
PWR
μP
60
BUFFER
64
66
QA
UP CTR
68
P
Q
C
70
C1
C2
RADAR
DIFF
RPM
72
74
76
78
80
82
84
86
61
62
90
28
32
132
134
136
138
140
ENG/MET
DIFF. INPUT ENABLE
IMPL. STATUS

TRACTOR DATA CENTER

BACKGROUND OF THE INVENTION

The present invention is directed generally to the monitoring arts and more particularly to apparatus for monitoring a plurality of vehicle functions and conditions in a vehicle such as a tractor used in agriculture.

While the monitoring apparatus of the invention may find utility in conjunction with the monitoring of the functions and conditions any of a plurality of different types of vehicles, the disclosure will be facilitated by reference to a tractor of the type used in agricultural operations.

In recent years, such tractors have become increasingly complex and expensive. Accordingly, it is desirable to carefully monitor the functions and conditions of an operating tractor, in order to ensure efficient operation thereof. Moreover, such monitoring may avert any breakdown or damage to this complex piece of equipment, which may be quite difficult and expensive to repair.

Furthermore, the operation of a vehicle such as a farm tractor requires a high degree of attentiveness on the part of the operator. Hence, such monitoring apparatus must be sufficiently simple to use so as not to detract from the operator's attention to the control of the tractor and associated machinery which may be pulled behind the tractor. Moreover, since such tractors are provided by different manufacturers and in different models, monitoring of the various functions and conditions thereof has heretofore required that a separate monitoring apparatus be provided for each type or model of tractor. Hence, it is desirable to provide a monitoring apparatus which may be readily and simply adapted to monitor the functions and conditions of any such model or type of tractor.

Additionally, in view of the increasing cost of fuel, it is important that such a vehicle be operated as efficiently as possible. Importantly in this regard, wheel slippage is to be optimized so as to optimize the relationship between work accomplished, vehicle and tire wear and fuel consumption. However, wheel slippage is notoriously difficult to accurately measure, as such tractors generally have a plurality of different gear ratios or gear ratio ranges in which they may be operated. Moreover, different sensors have heretofore been provided on such vehicles for measuring engine RPMs and for measuring the wheel rotational speed of the vehicle, either directly or by analogy to a ground speed measured by some other means such as radar. Hence, it has heretofore been difficult to provide an inexpensive yet accurate apparatus for achieving a reliable wheel slippage measurement regardless of the types and locations of such RPM and ground speed sensors provided on the tractor.

OBJECTS AND SUMMARY OF THE INVENTION

Accordingly, it is a general object of the present invention to provide a novel and improved monitoring apparatus for a vehicle.

A more specific object is to provide a novel and improved monitoring apparatus for a tractor of the type used in agriculture.

A further object is to provide a monitor of the foregoing type which is relatively simple to use and yet accurately monitors a plurality of vehicle functions and conditions.

A more specific object is to provide a monitor of the foregoing type which provides an accurate measurement of wheel slippage.

A further object is to provide a monitor in accordance with the foregoing objects which is readily adaptable for use with any one of a broad variety of different vehicles having different operating characteristics and having various types of sensors for sensing the functions and conditions to be monitored.

Briefly, in accordance with the foregoing objects, a monitoring apparatus is provided for a vehicle including a plurality of sensors for detecting a plurality of vehicle functions and conditions and for producing corresponding sensor signals. The monitoring apparatus comprises a console including operator actuatable control means, and control circuit means including means for calculating wheel slippage of at least one drive wheel of said vehicle. The calculating means includes means responsive to sensor signals corresponding to engine RPM of the vehicle and to sensor signals corresponding to the rotational speed of said at least one drive wheel for calculating a predetermined relationship therebetween. The control circuit means also includes calibration means responsive to actuation of said operator actuatable control means for setting said calculated relationship to a predetermined reference value when there is substantially no load on the vehicle and hence minimum slippage of the drive wheel. This setting is made for each of a plurality of ranges of gear ratios of the vehicle, thereby calibrating the calculating circuit means to calculate wheel slippage for each of a plurality of gear ratios.

Other objects, features and advantages of the invention will be more readily appreciated upon reading the following detailed description of the illustrated embodiments and referring to the accompanying drawings, wherein:

DETAILED DESCRIPTION OF THE ILLUSTRATED EMBODIMENT

Figure 1:
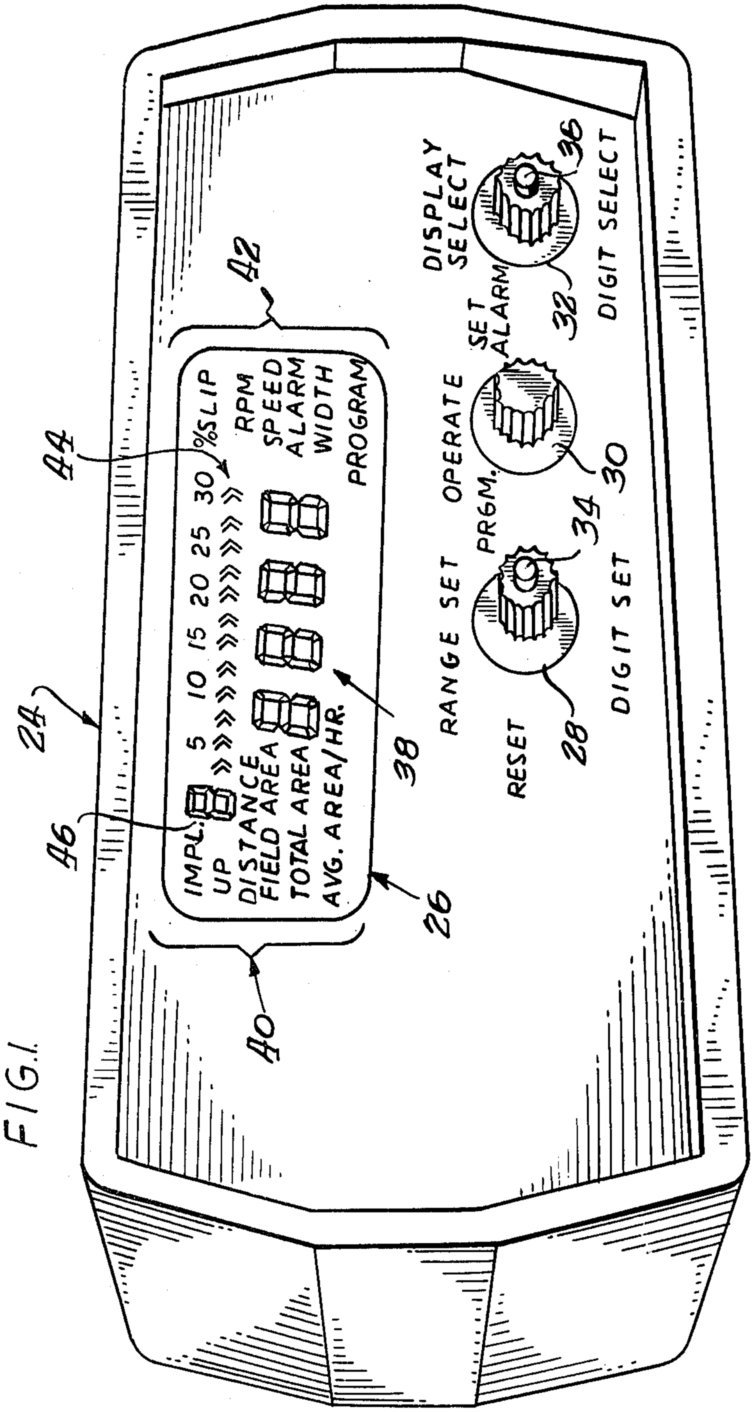
FIG. 1 is a front perspective view of a monitoring and control concole in accordance with the invention.

Reference is initially invited to FIG. 1 wherein a preferred embodiment of a control and display console is indicated generally by the reference numeral 24. The console 24 includes a display panel designated generally 26 and three rotary dial-type control members 28, 30, 32. Additionally, the rotary control members 28 and 32 are provided with centrally mounted pushbutton controls 34, 36, respectively.

The display panel 26 preferably comprises a liquid crystal display panel (LCD), including four, seven-segment digital characters designated generally by the reference numeral 38. These display characters 38 indicate the value of a selected function, or as will be seen later, a value selected as an alarm point for a given function. A plurality of selectively energized messages, designated generally by the reference numerals 40 and 42, are arranged to either side of the digital characters 38 for indicating the selected function in response to operation of the control members 38 through 36, inclusive.

Additionally, a plurality of selectively energized bar segments designated generally by the reference numeral 44, are provided in conjunction with selectively energized digits 5, 10, 15, etc., to provide a graphic indication of a percentage value of wheel slippage of the vehicle. An additional seven-segment digital display character 46 is also provided immediately to the left of the graphic display 44, for indicating a gear ratio or gear range selection for purposes of measuring wheel slippage, as will be more fully described later.

To afford an understanding of the operation of the invention, the operation of the console of FIG. 1 will now be described. The operator actuatable controls 28 through 36, inclusive, permit the operator to set desired alarm levels for each of the functions to be monitored. In this regard, each of the rotary controls 28 and 32 comprises a twelve detent per revolution rotary switch, the passing of a detent in either direction providing a suitable signal to the control circuitry, to be described later, that the switch has been turned in the corresponding direction. The rotary control 30 comprises a three-position rotary switch.

In operation, when the rotary switch 30 is set to its center or "OPERATE" position, the graphic display 44 of wheel slippage is automatically selected. Each bar or segment of the graph 44 represents substantially 2.5% slippage, with the range of the graph extending 30%. With the switch 30 in the OPERATE position numeric readouts may be selected by rotating the control 32, including the ground speed of the vehicle (SPEED), engine "RPM", and as will be more fully described later, of the "TOTAL AREA" and "FIELD AREA", respectively, covered by an implement towed behind the tractor. Additionally, a numeric readout or display on the characters 38 may be selected for the current area per hour (AREA/HR.) and average area per hour (AVG. AREA/HR.) rates being covered by an implement towed by the tractor. A corresponding message 40, 42 is energized upon selection of each of the foregoing functions.

An Audible alarm (not shown in FIG. 1) will be sounded, together with flashing of the associated message 40 for the following conditions: exceeding the ground speed alarm point (SPEED), exceeding the wheel slip alarm point (%SLIP), or operating within a preset low RPM band (RPM). Depressing the pushbutton switch 36 during the sounding of an alarm will silence the audible alarm, but the associated message 40 will continue to flash. Moreover, the alarm point for any function may be set to zero, thereby disabling the giving of an alarm for that function. The foregoing operations are accomplished by manipulation of the operator controls as will be understood from the following discussion.

The operator may also manipulate the rotary switches 28 and 32 while the switch 30 is in the OPERATE position to effect one of a plurality of additional selections. For example, the gear range or gear ratio selection for purposes of measuring wheel slippage is made by rotating the control 28 clockwise or counterclockwise to cause the digital display character 26 to indicate a number between one and eight. In accordance with a feature of the invention, this range selection causes an internal memory, to be described later, to select a suitable constant or factor for enabling calculation of the percentage of wheel slippage in accordance with the gear range or gear ratio selected. It will be appreciated that in many tractors, a plurality of gear ratios or gear ranges are available, whereby the operator may select a number corresponding to the currently operating gear ratio or gear range as just described.

As mentioned above, with the control 30 in the OPERATE position, the condition or function whose value is to be displayed in the digital display characters 38 may be selected by rotation of the control 32. In the illustrated embodiment, the following conditions or functions are selected in response to rotation of the control 32: distance, field area, total area, average area/hour, current area/hour, percent slippage, RPM, ground speed and implement width. Rotation of the control 32 will sequence through these functions in the order in which they appear in the display panel. An implement monitoring function is also provided for determining whether an implement being pulled by the tractor is "down" or in a working position, or alternatively, "up" or in a transport position. A display message IMP UP is provided for giving this indication. It will be understood that a suitable implement condition sensor or "lift switch" is provided on the implement which will assume an open circuit condition or a closed circuit condition depending upon the "up" or "down" condition of the implement. In this regard, actuation of the pushbutton control 34 indicates to the monitor which condition, open circuit or closed circuit, of the lift switch is to be regarded as the active or working condition of the implement, so that the display message IMP UP may be given in response to the proper condition.

Moreover, it will be recognized that the counts of area and area per hour mentioned above are dependent upon the active or inactive condition of the implement. Hence, when the implement is in its down or working position, a counting function of the monitor is also activated to count the area covered and area per hour rate of coverage by the implement. Conversely, when the implement is in its up or transport condition this counting function is placed in a "hold" status.

The pushbutton switch 34 is also utilized to reset certain values or constants, when the rotary control 30 is moved to the program (PRGM) position. For example, the above mentioned area, area/hour and distance counts may be selected as described above by actuation of the rotary control 32, whereupon actuation of the pushbutton switch 34 will reset the selected count to zero. In this regard, the order of operation of the controls is as follows: first, the function select control 32 is moved until the desired function is indicated by the energizing of an associated message 40, secondly, the control 30 is moved to the program mode and finally the pushbutton 34 is actuated to accomplish resetting.

To calibrate the unit for use with the particular distance or ground speed sensor utilized on the vehicle or tractor, the speed function is selected by rotating the control 32 until the SPEED message 40 is energized. Thereupon, the control 30 is rotated to the program position, and the pushbutton 36 is depressed, with the vehicle in motion, as the vehicle passes a starting marker of a measured, 400-foot course. At the end of the measured course, the pushbutton 36 is again depressed, whereupon the monitor is automatically calibrated for use with the distance or ground speed sensor provided on that vehicle or tractor.

In accordance with a feature of the invention, the monitor is calibrated to calculate wheel slippage for as many as eight different gear ratios or ranges of the tractor or vehicle. In order to accomplish this calibration, the control 32 is rotated until the percent slip (% SLIP) message 42 is energized whereupon the control 30 is rotated to the program position. The control 28 is then rotated until the digital position. The control 28 is then rotated until the digital character 46 indicates a number corresponding to the gear range or gear ratio in which the vehicle is currently being operated. The vehicle is then driven in a substantially zero wheel slippage condition. That is, the vehicle or tractor is driven over a substantially flat, hard surface, with no implement or the like attached, or in a substantially "no load" condition, such that substantially zero wheel slippage is to be expected. Thereafter, a single depression of the pushbutton 34 calibrates the monitor automatically for that gear ratio or gear range.

When the calibration has been accomplished, a zero will be displayed in the digital characters 38 to indicate the zero slippage condition. This procedure may be repeated for each available gear ratio or gear range of the vehicle to accomplish calibration of the monitor for calculating wheel slippage for each gear ratio or gear range. Thereafter, the operator need only set the number displayed by the digital character 46 to correspond with the gear ratio or gear range in which the vehicle or tractor is being operated to ensure an accurate wheel slippage calculation and readout for operation in that gear ratio or gear range.

In tractors not equipped with a drive train or differential sensor wheel slippage is computed based upon engine RPM and ground speed (e.g., radar) inputs. The "expected" wheel rotational speed is inferred from engine RPM in this case. In tractors equipped with a differential or drive train sensor or a direct wheel speed sensor, the computation of wheel slippage is based upon one of these inputs and the ground speed input. In this latter case, the calibration procedure outlined above need only be carried out once to accomplish calibration for any number of gear ratios or ranges. The digital character 46 is therefore disabled in this latter case. The monitor, as will be seen later, automatically detects the presence or absence of a differential or drive train sensor or direct wheel speed sensor and carries out calibration and wheel slippage calculations in the appropriate fashion.

Alarm points, that is, values of various functions for which a visual and/or audible alarm is to be given, may also be preselected by the operator. In each case, the function for which an alarm point is to be set is selected by rotating the control 30 until the message 42 corresponding to that function is energized. In the illustrated embodiment, alarm points may be set in this fashion for excessive wheel slippage for a low RPM operation of the vehicle or for excessive ground speed of the vehicle. After selecting one of these functions by rotation of the control 32, the control 30 is moved to the SET ALARM position, whereupon depression of the pushbutton control 34 will reset the alarm point to zero and disable that alarm function. A new alarm point may then be set by rotating the control 28, which will cause one of the graphic segments 44 to be energized above one of the digits 38 to be set to a desired value. Thereupon rotation of the control 32 will cause the selected digit 38 to incrementally advance or incrementally decrease, depending upon the direction of rotation, clockwise or counterclockwise, of the control 32. In this fashion, the operator may individually set the digits. When the desired value is displayed, rotation of the control 30 to the OPERATE position sets in that value and rotation back to the SET ALARM position automatically selects the next alarm point to be set, in the order % SLIP, RPM, SPEED. When all of the desired alarm or limit values have been set in this fashion the control 30 is returned to the OPERATE position.

In the case of the low RPM band alarm point, the operator will set the desired value of the high point of that band, within which an alarm is to be given. The monitor is precalibrated to set a value 500 RPM below the set point as the lower limit of the band. Below 200 RPM, it is assumed that the vehicle is not in a fully up or running condition and the monitor will be disabled.

An RPM conversion constant and implement width may each be set by the operator as numeric values by utilizing the display characters 38 and the digit set and digit select function of the switches 32 and 34 in the same fashion described above. When the monitor is initially installed on a given vehicle, the RPM conversion constant is set to relate the sensor pulses produced by the RPM sensor associated with that vehicle to the revolutions of the engine crankshaft, and a suitable number or constant will be supplied to the user in an operator's manual. The implement width is utilized by the monitor for all of the area and rate functions, and needs to be set or reset whenever the effective width of the implement being pulled by the tractor is changed, or when an implement of different width is to be used. In either case the function, either RPM or width is selected by rotating the rotary switch 32 until the corresponding message 42 is energized. The rotary switch 30 is then moved to the program position and the digit selected and digit set functions of the controls 32 and 34 are utilized as described above.

When the rotary control 30 is in the operate mode, depressing pushbutton 36 causes all of the messages 40 and 42 to energize, allowing the operator to inspect the choices and observe the direction of rotation of the rotary dial 32 required to reach a desired function. As each function is selected by the dial 32, the corresponding message 40, 42 will flash on and off, as long as pushbutton 36 is held.

Having reviewed the basic operation of the monitoring unit console embodied in FIG. 1, the monitoring circuits associated therewith will now be described with reference to FIGS. 2A and 2B.

Figure 2A:
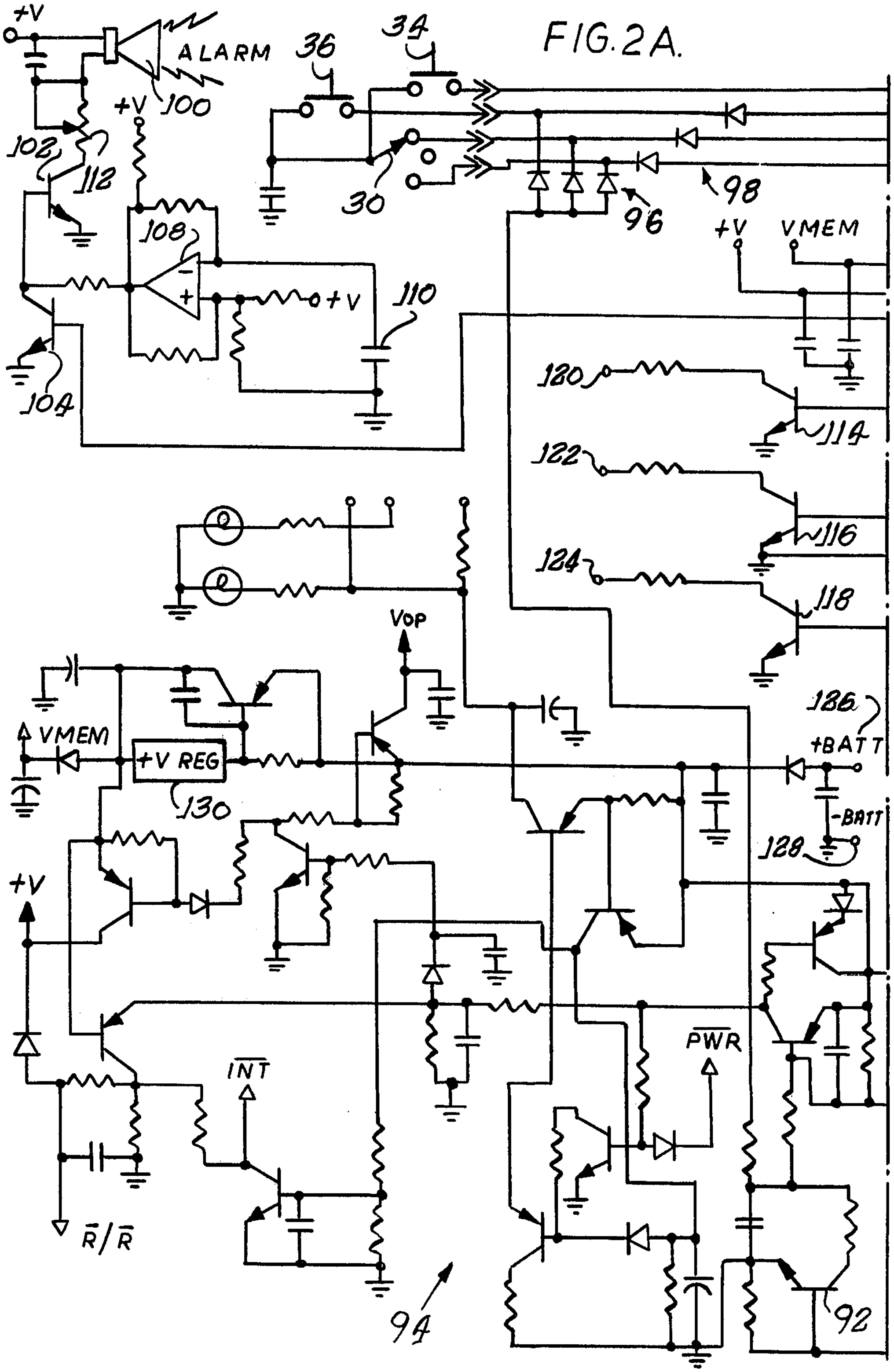
FIGS. 2A and 2B, taken together, form a schematic circuit diagram of a monitoring and control circuit associated with the console of FIG. 1.
Figure 2B:
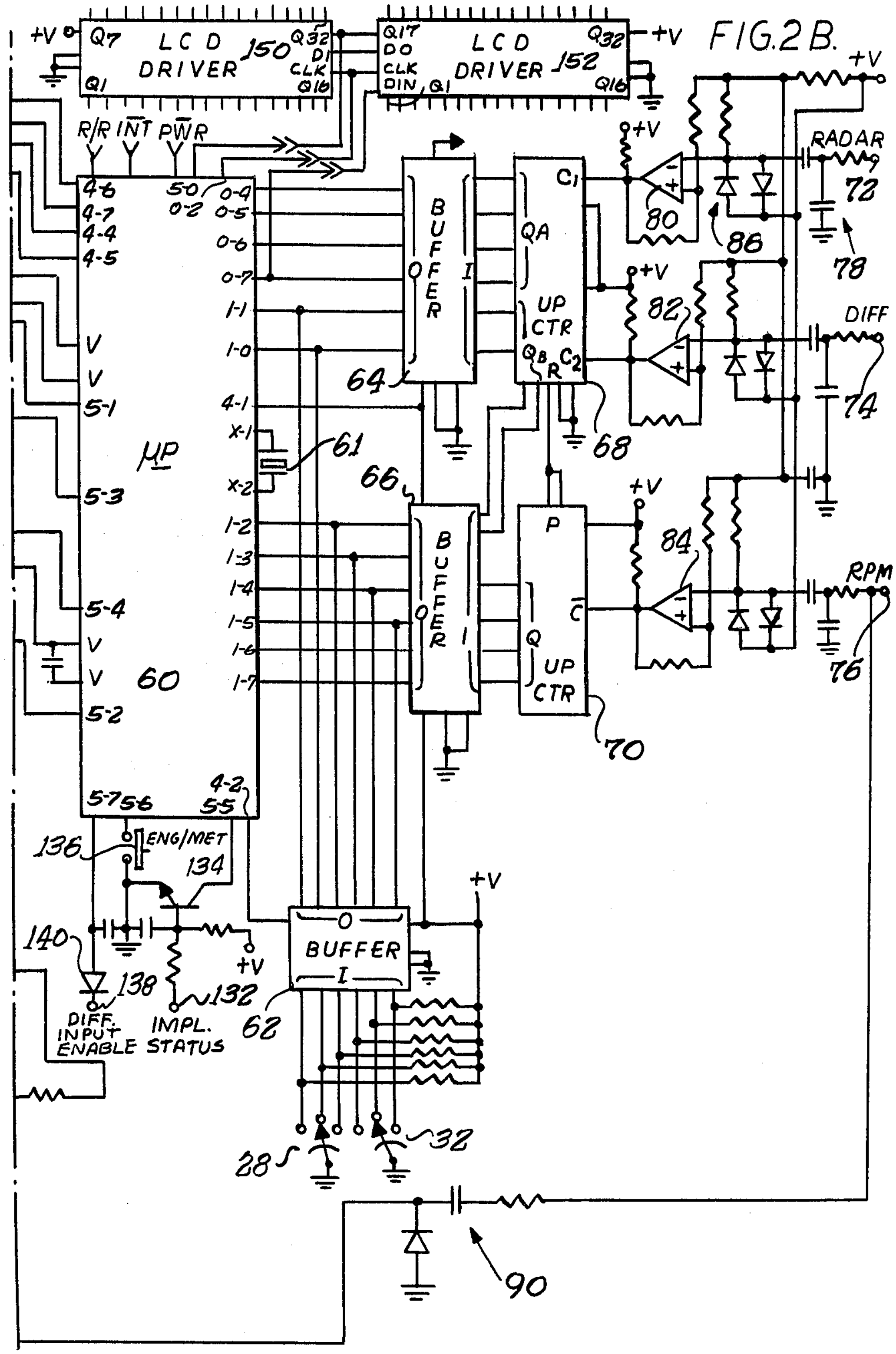

Referring now to FIGS. 2A and 2B, an exemplary monitoring circuit associated with the monitor 24 of FIG. 1 is illustrated in circuit schematic form. This circuit includes a microprocessor 60, which in the illustrated embodiment is preferably of the type MK3872 manufactured by Mostek and is an F8 type single-chip microcomputer. Published literature describing this component is generally available and hence it need not be described in detail herein. Generally speaking, the microcomputer or microprocessor 60 includes four, 8-bit input/output ports, which are designated by hyphenated numbers indicating first the port number (0, 1, 4, or 5) and secondly, the bit number (0 through 7). Positive voltage input terminals are indicated by the letter V. Conventionally, a four megahertz crystal 61 is coupled across input terminals 1 and 2 of the microprocessor 60 to provide a time base for an internal clock.

Other conventional input terminals of the microprocessor 60 include an external Reset-Ram protect terminal (R/R), and an external interrupt terminal (INT).

The rotary control switches 28 and 32 are seen in FIG. 2B to each comprise a single pole, three position switch. As mentioned above, each of these switches has twelve detent positions, and therefore the pattern of three poles is repeated four times within one full rotation of each control switch 28, 32. The processor determines the position of the switch as the pole contacted changes by the order in which the contact moves. The contacts from each of these switches 28 and 32 are provided with suitable pull-ups and feed respective inputs of a 6-bit buffer component 62, which in the illustrated embodiment comprises an integrated circuit of the type generally designated 4502. The six output lines of the buffer 62 feed the six lower order bits (1-0 through 1-5) of port 1 of the microprocessor 60. Hence, port 1 of the microprocessor is used as an input port in this connection.

The eight bits of port 1 of the microprocessor 60, together with the four highest order bits of port 0 also receive inputs from a pair of 6-bit buffer components 64, 66 which in the illustrated embodiment also each comprises an integrated circuit of the type generally designated 4502. The inputs of these buffers 64 and 66 are fed from the Q outputs of a pair of digital counter circuits 68, 70. In the illustrated embodiment the counter 68 comprises a dual binary up-counter of the type generally designated 4520, while the counter 70 is a 7-stage binary counter of the type 4024.

These counters 68 and 70 receive input signals from a distance or ground speed sensor, from a tractor differential or drive shaft sensor, if one is provided, and from an engine RPM sensor, all associated with the vehicle or tractor. In the illustrated embodiment, an input 72 receives signals from a radar-based distance or ground speed sensor, while an input 74 receives signals from the differential sensor and a further input 76 receives signals from an engine RPM sensor. Suitable intervening circuits are provided between each of these inputs and the associated counter 68 or 70, and these three input circuits are identical, whereby only one will be described. The radar input 72 feeds a suitable signal shaping RC network designated generally 78, which in turn feeds the inverting input of an operational amplifier (op amp) 80. The output of this op amp 80 feeds the first count input of the up-counter 68. A similar operational amplifier 82 associated with the differential input circuit feeds the second count input of the counter 68, while a further operational amplifier 84 associated with the RPM input circuit feeds the count input of the second counter 70. Each of these operational amplifiers 80, 82 and 84 is provided with a suitable feedback network and has a suitable reference point set at the non-inverting input thereof by selected resistors. Additionally, a pair of back-to-back diodes, designated generally by the reference numeral 86 in the case of the radar input circuit, run between the inverting input of each op amp 80, 82, 84 and a selected resistor drop away from a positive supply voltage +V.

The monitoring circuit of FIG. 2A and 2B is further responsive to the presence or absence of an RPM signal at the terminal 76 for respectively powering up and powering down the circuit. Accordingly, a line from the RPM input 76 is fed by way of suitable network designated generally 90 to a transistor 92 which when turned on by an RPM signal of sufficient amplitude at input 76 enables the circuit to turn on. In the absence of a sufficient amplitude RPM signal, the transistor 92 turns the circuit off after the RC delay of the network 90. The emitter electrode of the transistor 92 is AC coupled to the anode electrodes of three diodes designated generally by the reference numeral 96. The cathodes of these diodes 96 are coupled to the respective anodes of three further diodes designated generally by the reference numeral 98, which have their respective cathodes coupled to three bits (4-4, 4-5 and 4-7) of port 4 of the microprocessor 60. These three bits of port 4 also receive inputs from the control switches 30 and 36 of FIG. 1 by way of the diodes 98. Bit 4-6 of the microprocessor 60 also receives an input directly from the control switch 34 of the console 24 of FIG. 1. Hence, port 4 comprises a control input port to the microprocessor for detecting the conditions of the control switches 30, 34 and 36. Accordingly, the circuit may also be powered up by pressing button 36 or by turning control 30 to either of the program or set alarm positions.

Four bits 5-1 through 5-4 of port 5 of the microprocessor 60 are utilized for output purposes. The 5-1 bit feeds an audible alarm circuit (see FIG. 2A) which includes an audible alarm 100 and a suitable driving circuit for the alarm 100 including transistors 102 and 104. The transistor 104 is normally enabled from the output 5-1 of the microprocessor 60, to inhibit the audible alarm 100. In the event of an alarm condition existing in the tractor, as discussed above, the transistor 104 is disabled and an oscillator circuit comprising an operational amplifier 108, a timing capacitor 110 and related components which feed the junction point between the transistors 102 and 104 energizes the audible alarm 100. Additionally, a loudness control level for alarm 100 is provided in the form of a current limiting potentiometer 112 interposed between the collector electrode of the transistor 102 and the input of the alarm 100. The remaining terminal of the alarm 100 is coupled to a suitable positive voltage supply.

The outputs 5-2, 5-3, and 5-4 of the microprocessor 60 feed three switching transistors 114, 116, and 118, each of which in turn provides a switched output 120, 122, 124. The switched outputs 120, 122, and 124 comprise respectively a pair of wheel slippage alarm point outputs and a low RPM band alarm point output. Accordingly, additional external alarm or control circuits may be interconnected for energization by these outputs in response to the respective alarm conditions, as described above, associated with the respective outputs 120, 122, and 124.

The power up/power down and voltage regulation circuit 94 is energized from a 12-volt vehicle battery at input terminals 126 and 128 and includes a suitable positive voltage regulating integrating circuit component 130 which in the illustrated embodiment is of the type generally designated MC1404U5. This voltage regulating component 130 provides a source of regulated voltage for the memory components of the microprocessor 60 designated VMEM. The voltage regulation circuits 94 also provide a suitable positive voltage source +V for the other circuit components of FIGS. 2A and 2B, as well as control voltages VOP, R/R, INT and PWR for the microprocessor 60, which control voltages are fed to the like-designatted inputs of a microprocessor 60 described above.

Bit 5-5 of port 5 of the microprocessor 60 receives an input from an implement status terminal 132 by way of a transistor 134. This implement status input 132 receives signals from an implement sensor, as described above, indicating whether an implement pulled by the tractor is in a working condition or in a transport condition.

The bit 5-6 of port 5 receives an input from an English/Metric switch 136, whereby the operator may select either the English or Metric system of measurement for the quantities whose values are displayed in the digits 38 of the display 26 illustrated in FIG. 1. The bit 5-7 of port 5 is coupled with a differential input enable terminal 138 by way of a diode 140 which signals the microprocessor 60 that a differential sensor is present at the input 74. That is, a given signal level a bit 5-7 indicates that the particular tractor with which the monitor of the invention is associated is equipped with a differential sensor coupled to the terminal 74.

A pair of suitable liquid crystal display (LCD) driver components 150, 152 are driven in serial fashion from the 0–7 bit of port 0 of the microprocessor 60. Additionally, clock and control signals for the LCD drivers 150, 152 are provided respectively by the bits 0-2 and 5-0 of ports 0 and 5, respectively, of the microprocessor 60. In the illustrated embodiment, these LCD driver components comprise integrated circuit components of the type generally designated MD4332B. These LCD drivers 150, 152 operate in conventional fashion to energize the digital display elements 38 and 46, the bar graph display elements 44 and the function messages 40 and 42 of the display 26 illustrated in FIG. 1.

In order to fully illustrate a specific embodiment of the invention, an exemplary program for the microprocessor 60 of FIG. 2B is reproduced on the following pages.

```
                          *
                          *
                          *
                                  TITLE 'TPM II   RCFUHN   26 JUNE 1980'
                          *
                          *
0000 1A                   MAIN    DI
0001 70                           CLR
0002 B0                           OUTS  0
0003 B1                           OUTS  1
0004 B4                           OUTS  4
0005 B6                           OUTS  6
0006 201C                         LI    H'1C'
0008 B5                           OUTS  5
0009 203F                         LI    O'77'
000B 50                           LR    0,A
000C 40                   MA1     LR    A,0
000D 0B                           LR    IS,A
000E 70                           CLR
000F 5C                           LR    S,A       CLEAR ALL SCRATCHPAD MEMORY
0010 30                           DS    0
0011 94FA    000C                 BNZ   MA1
0012 A6                           INS   6
0014 9104    0019                 BM    *+5       CHECK FOR SHORT
0016 2900A0  00A0                 JMP   EXTINT
0019 71                           LIS   1
001A B6                           OUTS  6
001B 1B                           EI
001C 63                           LISU  3         1.5 SEC DISP TEST
001D 6F                           LISL  7
001E 9009    0028                 BR    MA2
                          *
                                  ORG   H'20'
0020 2C                   TIMER   XDC             TIMER INTERRUPT
0021 1E                           LR    J,W       SAVE ALL STATUS
0022 5A                           LR    10,A
0023 0A                           LR    A,IS
0024 5B                           LR    11,A
0025 2900C4  00C4                 JMP   TMR1
                          *
0028 20FF                 MA2     LI    H'FF'
002A 5E                           LR    D,A
002B 8FFE    002A                 BR7   *-1
002D A5                           INS   5
002E 8105    0034                 BP    PWU1      DIFF IN EN?
0030 6C                           LISL  4         YES; DELETE 5TH DIG
0031 2080                         LI    H'80'
0033 5C                           LR    S,A
0034 280C99  0C99         PWU1    PI    DISOUT
0037 73                           LIS   3
0038 50                           LR    0,A       NOW WAIT
0039 51                           LR    1,A
```

```
003A 32              0053  PWU2     DS    2
003B 94FE     003A   0054           BNZ   PWU2
003D 31              0055           DS    1
003E 94FB     003A   0056           BNZ   PWU2
0040 30              0057           DS    0
0041 94F8     003A   0058           BNZ   PWU2
0043 20FA            0059           LI    250        INIT TIMER INT
0045 B7              0060           OUT   7
0046 1A              0061           DI
0047 208B            0062           LI    H'8B'
0049 B6              0063           OUTS  6
004A 74              0064           LIS   4
004B B4              0065           OUTS  4
004C A1              0066           INS   1          LOAD INIT SWITCH POS
004D 62              0067           LISU  2
004E 6E              0068           LISL  6
004F 5C              0069           LR    S,A
0050 70              0070           CLR
0051 B4              0071           OUTS  4          DISABLE SW BUF
0052 68              0072           LISL  0
0053 20AA            0073           LI    H'AA'
0055 5D              0074           LR    I,A
0056 2014            0075           LI    20
0058 5C              0076           LR    S,A
0059 2A0FF6 0FF6     0077           DCI   H'FF6'     CLR READINGS
005C 7A              0078           LIS   10
005D 50              0079           LR    0,A
005E 70              0080           CLR
005F 17              0081           ST
0060 30              0082           DS    0
0061 94FD     005F   0083           BNZ   *-2
0063 2A0FF4 0FF4     0084           DCI   H'FF4'
0066 7F              0085           LIS   H'F'
0067 8A              0086           NM               CHECK FOR GOOD SLIP SELECT
0068 8405     006E   0087           BZ    MA5
006A 2508            0088           CI    8
006C 8206     0073   0089           BC    MA6
006E 2A0FF4 0FF4     0090  MA5      DCI   H'FF4'
0071 71              0091           LIS   1
0072 17              0092           ST
0073 1A              0093  MA6      DI               START HERE TO ENTER OP
0074 2A0FF4 0FF4     0094           DCI   H'FF4'
0077 16              0095           LM
0078 14              0096           SR    4
0079 15              0097           SL    4          LOAD PREV SEL FUNCTION
007A 2540            0098           CI    H'40'
007C 8405     0082   0099           BZ    MB1        NO TEST FUNCTION
007E 2590            0100           CI    H'90'
0080 8202     0083   0101           BC    *+3
0082 70              0102  MB1      CLR
0083 58              0103           LR    8,A
0084 62              0104           LISU  2
0085 6D              0105           LISL  5
0086 201C            0106           LI    H'1C'      INIT ALARM FLAGS
0088 5C              0107           LR    S,A
0089 6F              0108           LISL  7
008A 70              0109           CLR
008B 5C              0110           LR    S,A        INIT STATUS FLAGS
008C 65              0111           LISU  5
008D 6A              0112           LISL  2
008E 5C              0113           LR    S,A
008F 290C37 0C37     0114           JMP   CHKSUM
0092 8406     0099   0115  MCRET    BZ    MA3
0094 20F0            0116           LI    H'F0'      AT LEAST ONE CHECKSUM BAD
0096 58              0117           LR    8,A        FUNCTION = "FAIL"
0097 9029     00C1   0118           BR    WAIT
0099 62              0119  MA3      LISU  2
009A 6F              0120           LISL  7          SET CHK OK FLAG
009B 4C              0121           LR    A,S
009C 2204            0122           OI    4
```

```
009E 9021    00C0              BR    JPEI     JMP AROUND INT
                         *
                                ORG   H'A0'
00A0 70                  EXTINT CLR
00A1 B6                         OUTS  6        KILL INTERRUPTS
00A2 201F                       LI    H'1F'
00A4 B5                         OUTS  5        PWR DRIVE OFF, ALARM ON
00A5 280CC0 0CC0                PI    DISCLR
00A8 2A0DE3 0DE3                DCI   MSSHCR   DISPLAY "SHCR"
00AB 280CC8 0CC8                PI    LDMSG
00AE 280C99 0C99                PI    DISOUT
00B1 73                         LIS   3
00B2 50                         LR    0,A
00B3 51                         LR    1,A      WAIT 1.5 SECONDS
00B4 32                  EXT1   DS    2
00B5 94FE    00B4               BNZ   EXT1
00B7 31                         DS    1
00B8 94FB    00B4               BNZ   EXT1
00BA 30                         DS    0
00BB 94F8    00B4               BNZ   EXT1
00BD 290000 0000                JMP   MAIN     RE-TRY
                         *
00C0 5C                  JPEI   LR    S,A
00C1 1B                  WAIT   EI
00C2 90FF    00C2               BR    *
                         *
00C4 62                  TMR1   LISU  2        TIMER INTERRUPT, CONTINUED
00C5 68                         LISL  0
00C6 20F0                       LI    H'F0'
00C8 CC                         AS    S
00C9 5C                         LR    S,A      DECR 40.HZ TIMER
00CA 14                         SR    4
00CB 9405    00D1               BNZ   TMR2     IF 5X OR 0X THEN
00CD 30                         DS    0         TOGGLE BACKPLANE
00CE 2B                         NOP             EQUALIZE TIMES TO
00CF 9005    00D5               BR    TMR3      AVOID DC OFFSET
00D1 2505                TMR2   CI    5
00D3 9407    00DB               BNZ   TMR4
00D5 A0                  TMR3   INS   0
00D6 2304                       XI    4        TOGGLE IT
00D8 2104                       NI    4
00DA B0                         OUTS  0
00DB 72                  TMR4   LIS   2
00DC B4                         OUTS  4        ENABLE COUNTER BUFFERS
00DD A0                  TMR5   INS   0
00DE 50                         LR    0,A
00DF A0                         INS   0
00E0 E0                         XS    0        MAKE SURE READING IS
00E1 94FB    00DD               BNZ   TMR5      STABLE
00E3 6A                         LISL  2
00E4 4C                         LR    A,S
00E5 18                         COM            NEW DIST COUNTS?
00E6 1F                         INC
00E7 C0                         AS    0
00E8 14                         SR    4
00E9 51                         LR    1,A
00EA 40                         LR    A,0
00EB 21F0                       NI    H'F0'
00ED 5C                         LR    S,A      SAVE LAST READING
00EE 64                         LISU  4
00EF 68                         LISL  0
00F0 41                         LR    A,1      ADD NEW COUNTS
00F1 CC                         AS    S
00F2 5D                         LR    I,A
00F3 4C                         LR    A,S
00F4 19                         LNK
00F5 5C                         LR    S,A
00F6 20FB                       LI    H'FB'
00F8 F8                         NS    8
00F9 2521                       CI    H'21'
```

```
00FB 8408   0104        BZ     TMR6
00FD 6E                 LISL   6
00FE 41                 LR     A,1     YES; ADD COUNTS TO ACC
00FF CC                 AS     S
0100 5D                 LR     I,A
0101 4C                 LR     A,S
0102 19                 LNK
0103 5C                 LR     S,A
0104 A1          TMR6   INS    1
0105 50                 LR     0,A
0106 A1                 INS    1       LET STABILIZE
0107 E0                 XS     0
0108 94FB   0104        BNZ    TMR6
010A 62                 LISU   2
010B 6B                 LISL   3
010C 4C                 LR     A,S
010D 18                 COM
010E 1F                 INC
010F C0                 AS     0
0110 14                 SR     4
0111 51                 LR     1,A     NEW RPM COUNTS
0112 40                 LR     A,0
0113 21F0               NI     H'F0'
0115 5C                 LR     S,A     SAVE COUNTER STATE
0116 64                 LISU   4
0117 6A                 LISL   2
0118 41                 LR     A,1     ADD COUNTS TO ACC
0119 CC                 AS     S
011A 5D                 LR     I,A
011B 4C                 LR     A,S
011C 19                 LNK
011D 5C                 LR     S,A
011E A5                 INS    5
011F 8114   0134        BP     TMR7
0121 62                 LISU   2       DIFF INPUT ENABLED
0122 6C                 LISL   4
0123 4C                 LR     A,S
0124 18                 COM
0125 1F                 INC
0126 C0                 AS     0       NEW COUNTS
0127 210F               NI     H'F'
0129 51                 LR     1,A
012A 7F                 LIS    H'F'
012B F0                 NS     0
012C 5C                 LR     S,A
012D 64                 LISU   4
012E 41                 LR     A,1
012F CC                 AS     S
0130 5D                 LR     I,A
0131 4C                 LR     A,S
0132 19                 LNK
0133 5C                 LR     S,A
0134 70          TMR7   CLR
0135 B4                 OUTS   4       CLEAR INPUTS
0136 62                 LISU   2
0137 68                 LISL   0
0138 4C                 LR     A,S
0139 14                 SR     4       IS 40.HZ COUNTER ZERO?
013A 8408   0143        BZ     TMR8
013C 2C          TIMRET XDC            READY TO RETURN FROM
013D 4B                 LR     A,11    INTERRUPT
013E 0B                 LR     IS,A
013F 4A                 LR     A,10
0140 1D                 LR     W,J
0141 1B                 EI
0142 1C                 POP
                 *
0143 20A0        TMR8   LI     H'A0'
0145 CC                 AS     S       PRESET 40.HZ.COUNTER
0146 5C                 LR     S,A      TO 10
```

```
0147 73                CTRCHK   LIS    3         CHECK NO MODE
0148 F8                         NS     8
0149 2503                       CI     3
014B 9409    0155               BNZ    CCHK1
014D A4                         INS    4
014E 2130                       NI     H'30'     MODE = NO;
0150 944F    01A0               BNZ    CTR1      ONLY CHECK OP POS
0152 290073  0073               JMP    MA6
0155 A4                CCHK1    INS    4         CHECK ALL CONTROLS
0156 14                         SR     4
0157 E8                         XS     8         HAS MODE SWITCH MOVED?
0158 2103                       NI     3
015A 8445    01A0               BZ     CTR1
015C A4                         INS    4         YES
015D 2130                       NI     H'30'
015F 9404    0164               BNZ    *+5
0161 290073  0073               JMP    MA6       IF MOVED TO OPERATE, RESTAR
                       *
0164 14                         SR     4         SAVE NEW MODE
0165 50                         LR     0,A
0166 48                         LR     A,8
0167 21FC                       NI     H'FC'
0169 E0                         XS     0
016A 58                         LR     8,A
016B 259F                       CI     H'9F'
016D 820A    0178               BC     CTR2
016F 62                         LISU   2
0170 6F                         LISL   7         FUNCTION = FAIL
0171 4C                         LR     A,S
0172 2201                       OI     1
0174 5C                         LR     S,A
0175 290C37  0C37               JMP    CHKSUM
0178 71                CTR2     LIS    1
0179 F8                         NS     8
017A 840C    0187               BZ     CTR3
017C 48                         LR     A,8       MOVED TO PROG
017D 14                         SR     4
017E 2505                       CI     5         ALL OK EXCEPT RATE
0180 940B    018C               BNZ    CTR5
0182 73                CTR4     LIS    3
0183 58                         LR     8,A
0184 2903A2  03A2               JMP    TMR9
0187 48                CTR3     LR     A,8
0188 252F                       CI     H'2F'     ALARM; FUNC 0,1,OR 2 ONLY
018A 92F7    0182               BNC    CTR4
018C 65                CTR5     LISU   5
018D 6A                         LISL   2
018E 4C                         LR     A,S
018F 21FC                       NI     H'FC'
0191 5C                         LR     S,A       DIGIT SEL = 0
0192 20F3                       LI     H'F3'
0194 F8                         NS     8
0195 2521                       CI     H'21'     SPEED PROG?
0197 9405    019D               BNZ    CTR6
0199 48                         LR     A,8
019A 2204                       OI     4         SET ALLOW.DIST.PROG
019C 58                         LR     8,A
019D 29031F  031F      CTR6     JMP    CTP1
                       *
01A0 74                CTR1     LIS    4
01A1 B4                         OUTS   4         READ SWITCHES
01A2 62                         LISU   2
01A3 6E                         LISL   6
01A4 A1                         INS    1
01A5 2107                       NI     7
01A7 2507                       CI     7
01A9 8409    01B3               BZ     CTS1X     NO CONTACT MADE
01AB 50                         LR     0,A
01AC 18                         COM
01AD 1F                         INC
```

```
01AE CC                      AS     8
01AF 2107                    NI     7          ANY CHANGE?
01B1 9404   01B6             BNZ    *+5
01B3 29027D 027D     CTS1X   JMP    CTS1
01B6 51                      LR     1,A        YES!
01B7 20F8                    LI     H'F8'      S1 MOVED
01B9 FC                      NS     S
01BA E0                      XS     0          SAVE NEW POSITION
01BB 5C                      LR     S,A
01BC 73                      LIS    3
01BD F8                      NS     8
01BE 2503                    CI     3
01C0 8438   01F9             BZ     CTS2X
01C2 13                      SL     1          MODE <> NO
01C3 8408   01CC             BZ     CTS3
01C5 48                      LR     A,8        MODE <> OP
01C6 21F3                    NI     H'F3'
01C8 2501                    CI     1          SLIP.PROG?
01CA 943F   020A             BNZ    CTS4
01CC A5              CTS3    INS    5          YES
01CD 912B   01F9             BM     CTS2X
01CF 48                      LR     A,8
01D0 14                      SR     4
01D1 2504                    CI     4
01D3 8425   01F9             BZ     CTS2X
01D5 2509                    CI     9
01D7 9221   01F9             BNC    CTS2X
01D9 41                      LR     A,1        NO DIFF INPUT EN
01DA 2505                    CI     5
01DC 841F   01FC             BZ     S1DN       CHANGE SLIP RANGE SEL
01DE 2503                    CI     3
01E0 8403   01E4             BZ     S1UP
01E2 8219   01FC             BC     S1DN       DECIPHER DIRECTION
01E4 2A0FF4 0FF4     S1UP    DCI    H'FF4'
01E7 16                      LM
01E8 1F                      INC
01E9 50                      LR     0,A        INCREMENT IT
01EA 15                      SL     4
01EB 2590                    CI     H'90'
01ED 9406   01F4             BNZ    S1U1       BACK TO 1 IF > 8
01EF 40                      LR     A,0
01F0 24F8                    AI     -8
01F2 9002   01F5             BR     S1U2
01F4 40              S1U1    LR     A,0
01F5 2A0FF4 0FF4     S1U2    DCI    H'FF4'
01F8 17                      ST
01F9 29027A 027A     CTS2X   JMP    CTS2
01FC 2A0FF4 0FF4     S1DN    DCI    H'FF4'
01FF 16                      LM
0200 24FF                    AI     -1
0202 50                      LR     0,A
0203 15                      SL     4
0204 94EF   01F4             BNZ    S1U1
0206 78                      LIS    8
0207 C0                      AS     0
0208 90EC   01F5             BR     S1U2
020A 48              CTS4    LR     A,8
020B 15                      SL     4
020C 916D   027A             BM     CTS2       DIST.AUTOCAL?
020E 20F3                    LI     H'F3'
0210 F8                      NS     8
0211 2501                    CI     1          SLIP PROG?
0213 8466   027A             BZ     CTS2
0215 2561                    CI     H'61'      AVG.RATE PROG?
0217 8462   027A             BZ     CTS2
0219 48                      LR     A,8
021A 14                      SR     4          CHANGE VALUE IN RAM
021B 50                      LR     0,A
021C 72                      LIS    2
021D F8                      NS     8
021E 8402   0221             BZ     *+3
```

```
0220 7A                      LIS    10
0221 C0                      AS     0
0222 2A0D7B 0D7B             DCI    VTABLE     PT TO VALUE IN RAM
0225 8E                      ADC
0226 16                      LM
0227 2A0FC0 0FC0             DCI    H'FC0'
022A 8E                      ADC
022B 0E                      LR     Q,DC
022C 65                      LISU   5
022D 6A                      LISL   2
022E 72                      LIS    2          WHICH DIG SELECTED
022F FC                      NS     S
0230 8402   0233             BZ     *+3
0232 16                      LM                INC DC0 FOR HI BYTE
0233 41                      LR     A,1
0234 2505                    CI     5
0236 842D   0264             BZ     S1DE       INC OR DECR?
0238 2503                    CI     3
023A 8403   023E             BZ     S1IN
023C 8227   0264             BC     S1DE
023E 16              S1IN    LM
023F 51                      LR     1,A
0240 71                      LIS    1
0241 FC                      NS     S
0242 941C   025F             BNZ    S1I1       INCREMENT DIGIT
0244 41                      LR     A,1        LO DIGIT
0245 1F                      INC
0246 51                      LR     1,A
0247 210F                    NI     H'F'
0249 250A                    CI     10
024B 9405   0251             BNZ    S1I2
024D 20F6                    LI     -10
024F C1                      AS     1          ROLLOVER
0250 51              S1D4    LR     1,A
0251 20FF            S1I2    LI     -1
0253 8E                      ADC
0254 41                      LR     A,1
0255 17                      ST
0256 0F                      LR     DC,Q       NOW UPDATE CHECKSUM
0257 16                      LM
0258 88                      AM
0259 18                      COM
025A 2456                    AI     H'56'
025C 17                      ST
025D 901C   027A             BR     CTS2
025F 2076            S1I1    LI     H'76'      INC HI DIGIT
0261 D1                      ASD    1
0262 90ED   0250             BR     S1D4
0264 16              S1DE    LM
0265 51                      LR     1,A        DECR DIGIT
0266 71                      LIS    1
0267 FC                      NS     S
0268 940C   0275             BNZ    S1D1
026A 31                      DS     1
026B 7F                      LIS    H'F'       DEC LO DIGIT
026C F1                      NS     1
026D 2509                    CI     9
026F 82E1   0251             BC     S1I2
0271 7A                      LIS    10
0272 C1                      AS     1
0273 90DC   0250             BR     S1D4
0275 20F6            S1D1    LI     H'F6'      DECR HI DIGIT
0277 D1                      ASD    1
0278 90D7   0250             BR     S1D4
027A 29031F 031F     CTS2    JMP    CTP1
027D A1              CTS1    INS    1          CHECK S3 POSITION
027E 2138                    NI     H'38'
0280 2538                    CI     H'38'
0282 84F7   027A             BZ     CTS2
0284 50                      LR     0,A        SOME CONTACT MADE
```

```
0285 18                     COM
0286 1F                     INC
0287 CC                     AS      S
0288 2138                   NI      H'38'
028A 84EF    027A           BZ      CTS2
028C 51                     LR      1,A         MOVED
028D 20C7                   LI      H'C7'
028F FC                     NS      S
0290 E0                     XS      0           SAVE NEW POS
0291 5C                     LR      S,A
0292 73                     LIS     3
0293 F8                     NS      8
0294 2503                   CI      3           WHAT MODE?
0296 84E3    027A           BZ      CTS2        DONE IF NO
0298 13                     SL      1
0299 9444    02DE           BNZ     CS31
029B 48                     LR      A,8
029C 14                     SR      4
029D 2509                   CI      9
029F 92DA    027A           BNC     CTS2
02A1 41                     LR      A,1         IN OP MODE
02A2 2528                   CI      H'28'
02A4 8419    02BE           BZ      CS3L        FUNCTION CHANGE
02A6 2518                   CI      H'18'
02A8 8403    02AC           BZ      CS3U        WHICH WAY?
02AA 8213    02BE           BC      CS3L
02AC 48              CS3U   LR      A,8
02AD 21F0                   NI      H'F0'
02AF 2530                   CI      H'30'
02B1 9403    02B5           BNZ     *+4
02B3 2410                   AI      H'10'
02B5 2410                   AI      H'10'       INCR FUNCT #
02B7 2590                   CI      H'90'
02B9 8213    02CD           BC      CS3B
02BB 70                     CLR
02BC 9010    02CD           BR      CS3B
02BE 48              CS3L   LR      A,8
02BF 21F0                   NI      H'F0'
02C1 2550                   CI      H'50'
02C3 9403    02C7           BNZ     *+4
02C5 24F0                   AI      H'F0'
02C7 24F0                   AI      H'F0'       DECR FUNCT #
02C9 8203    02CD           BC      CS3B
02CB 24A0                   AI      H'A0'
02CD 58              CS3B   LR      8,A
02CE 2A0FF4  0FF4           DCI     H'FF4'      SAVE IN RAM
02D1 7F                     LIS     H'F'
02D2 8A                     NM
02D3 51                     LR      1,A
02D4 2A0FF4  0FF4           DCI     H'FF4'
02D7 20F0                   LI      H'F0'
02D9 F8                     NS      8
02DA E1                     XS      1
02DB 17                     ST
02DC 9042    031F           BR      CTP1
02DE 48              CS31   LR      A,8
02DF 15                     SL      4           S3 MOVED;
02E0 913E    031F           BM      CTP1         NOT OP MODE
02E2 48                     LR      A,8         NOT DIST.AUTOCAL
02E3 21F3                   NI      H'F3'
02E5 2501                   CI      1
02E7 8437    031F           BZ      CTP1        NOT SLIP.PROG
02E9 2561                   CI      H'61'
02EB 8433    031F           BZ      CTP1        NOT AVG.RATE.PROG
02ED 2522                   CI      H'22'
02EF 8409    02F9           BZ      AXX1        2 DIGS FOR SLIP
02F1 2502                   CI      2           3 DIGS FOR SPEED
02F3 71                     LIS     1
02F4 8405    02FA           BZ      AXX2         (ALARMS)
02F6 73                     LIS     3
02F7 9002    02FA           BR      AXX2
```

```
02F9 72             0545  AXX1    LIS    2          FOR SPEED ALARM
02FA 50             0546  AXX2    LR     0,A
02FB 65             0547          LISU   5
02FC 6A             0548          LISL   2
02FD 41             0549          LR     A,1
02FE 2528           0550          CI     H'28'
0300 8407     0308  0551          BZ     CS3G       INC OR DEC PTR?
0302 2518           0552          CI     H'18'
0304 8410     0315  0553          BZ     CS3R
0306 920E     0315  0554          BNC    CS3R
0308 4C             0555  CS3G    LR     A,S        INC DIG SEL
0309 E0             0556          XS     0
030A 50             0557          LR     0,A
030B 2103           0558          NI     3          AT HI END?
030D 40             0559          LR     A,0
030E 8403     0312  0560          BZ     CS32
0310 4C             0561          LR     A,S
0311 1F             0562          INC
0312 5C             0563  CS32    LR     S,A
0313 900B     031F  0564          BR     CTP1
0315 73             0565  CS3R    LIS    3          DECR DIG SEL
0316 FC             0566          NS     S
0317 9406     031E  0567          BNZ    CS34
0319 7F             0568          LIS    H'F'      FROM 0 TO (R0)
031A FC             0569          NS     S
031B E0             0570          XS     0
031C 90F5     0312  0571          BR     CS32
031E 3C             0572  CS34    DS     S
031F 70             0573  CTP1    CLR
0320 B4             0574          OUTS   4          DISABLE SWITCH BUF
0321 A4             0575          INS    4          CHECK PB SWITCHES
0322 13             0576          SL     1
0323 62             0577          LISU   2
0324 6F             0578          LISL   7
0325 9107     032D  0579          BM     CP11
0327 208F           0580          LI     H'8F'      P1 NOT ON
0329 FC             0581          NS     S          RESET P1.HELD
032A 5C             0582          LR     S,A
032B 903B     0367  0583          BR     CTP2
032D 4C             0584  CP11    LR     A,S        P1 ON
032E 13             0585          SL     1
032F 9137     0367  0586          BM     CTP2
0331 4C             0587          LR     A,S        WAS OFF
0332 2240           0588          OI     H'40'
0334 5C             0589          LR     S,A        SET P1.HELD
0335 73             0590          LIS    3
0336 F8             0591          NS     8
0337 940D     0345  0592          BNZ    CP13
0339 2A0FF5   0FF5  0593          DCI    H'FF5'     OP MODE
033C 2020           0594          LI     H'20'      TOGGLE IMP STATUS LEVEL
033E 8C             0595          XM
033F 2A0FF5   0FF5  0596          DCI    H'FF5'
0342 17             0597          ST
0343 9023     0367  0598          BR     CTP2
0345 20F3           0599  CP13    LI     H'F3'      MODE NOT OP
0347 F8             0600          NS     8
0348 2501           0601          CI     1          SLIP.PROG?
034A 9418     0363  0602          BNZ    CP14
034C A5             0603          INS    5
034D 71             0604          LIS    1          STORE ZERO SLIP NUMBER
034E 9106     0355  0605          BM     CP15
0350 2A0FF4   0FF4  0606          DCI    H'FF4'     IF NOT DIFF IN ENABLE,
0353 7F             0607          LIS    H'F'        GET SELECTED SLIP RANGE
0354 8A             0608          NM
0355 2A0FDF   0FDF  0609  CP15    DCI    H'FDF'
0358 13             0610          SL     1
0359 8E             0611          ADC
035A 65             0612          LISU   5
035B 6E             0613          LISL   6
035C 4D             0614          LR     A,I        STORE IT. . .
```

```
035D 17             0615            ST
035E 4C             0616            LR     A,S
035F 17             0617            ST
0360 62             0618            LISU   2
0361 9005    0367   0619            BR     CTP2
0363 4C             0620   CP14     LR     A,S
0364 2230           0621            OI     H'30'     SET 'RESET PENDING' TO 3
0366 5C             0622            LR     S,A
0367 A4             0623   CTP2     INS    4
0368 9108    0371   0624            BM     CP21      CHECK P2
036A 4C             0625            LR     A,S       NOT ON
036B 13             0626            SL     1
036C 12             0627            SR     1         RESET P2.HELD
036D 5C             0628            LR     S,A
036E 2903A2  03A2   0629   TMR9X    JMP    TMR9
0371 2080           0630   CP21     LI     H'80'
0373 EC             0631            XS     S         P2 ON
0374 81F9    036E   0632            BP     TMR9X     HELD NOW?
0376 5C             0633            LR     S,A       SET P2.HELD
0377 73             0634            LIS    3
0378 F8             0635            NS     8         MODE?
0379 9408    0382   0636            BNZ    CP22
037B 6D             0637            LISL   5         OP
037C 4C             0638            LR     A,S
037D 2240           0639            OI     H'40'     SET ALARM.INHIBIT
037F 5C             0640            LR     S,A
0380 90ED    036E   0641            BR     TMR9X
0382 20F3           0642   CP22     LI     H'F3'     NOT OP
0384 F8             0643            NS     8
0385 2521           0644            CI     H'21'
0387 94E6    036E   0645            BNZ    TMR9X
0389 74             0646            LIS    4         IN SPEED.PROG MODE
038A F8             0647            NS     8         ALLOW FLAG SET?
038B 840B    0397   0648            BZ     CP23
038D 2029           0649            LI     H'29'     START DIST.AUTOCAL
038F 58             0650            LR     8,A
0390 64             0651            LISU   4
0391 6E             0652            LISL   6         CLEAR ACC
0392 70             0653            CLR
0393 5D             0654            LR     I,A
0394 5C             0655            LR     S,A
0395 90D8    036E   0656            BR     TMR9X
0397 78             0657   CP23     LIS    8
0398 F8             0658            NS     8
0399 84D4    036E   0659            BZ     TMR9X
039B 4C             0660            LR     A,S       DONE W/AUTOCAL
039C 2202           0661            OI     2         SET COMPUTE FLAG
039E 5C             0662            LR     S,A
039F 2021           0663            LI     H'21'
03A1 58             0664            LR     8,A
03A2 62             0665   TMR9     LISU   2
03A3 68             0666            LISL   0
03A4 3C             0667            DS     S         DECR 4.HZ.COUNTER
03A5 4C             0668            LR     A,S
03A6 15             0669            SL     4
03A7 8404    03AC   0670            BZ     TMR10
03A9 29013C  013C   0671            JMP    TIMRET    DONE
03AC 7A             0672   TMR10    LIS    10
03AD CC             0673            AS     S
03AE 5D             0674            LR     I,A       DO 4.HZ.TASKS
03AF 3C             0675   TIME4    DS     S
03B0 73             0676            LIS    3         DECR 5 SEC COUNTER
03B1 FC             0677            NS     S
03B2 8405    03B8   0678            BZ     TIME1
03B4 1B             0679            EI
03B5 2907D5  07D5   0680            JMP    TM41
03B8 6F             0681   TIME1    LISL   7
03B9 64             0682   TM11     LISU   4
03BA 4C             0683            LR     A,S
03BB 63             0684            LISU   3
```

```
03BC 5E                     LR    D,A
03BD 8FFB   03B9            BR7   TM11
03BF 6B                     LISL  3
03C0 A5                     INS   5
03C1 8113   03D5            BP    TMX1
03C3 20F3                   LI    H'F3'
03C5 F8                     NS    8
03C6 2521                   CI    H'21'
03C8 840C   03D5            BZ    TMX1
03CA 6D                     LISL  5
03CB 70                     CLR
03CC CE                     AS    D
03CD 9406   03D4            BNZ   TMX2
03CF 4E                     LR    A,D
03D0 2564                   CI    100
03D2 8202   03D5            BC    TMX1      CLEAR ONLY IF >100
03D4 6F               TMX2  LISL  7
03D5 64               TMX1  LISU  4
03D6 70                     CLR
03D7 5E               TMX3  LR    D,A
03D8 8FFE   03D7            BR7   TMX3
03DA 1B                     EI
03DB 280CD0 0CD0            PI    MDTMCD    COMPUTE CALIB
03DE 2A0FCF 0FCF            DCI   H'FCF'     DIST COUNTS
03E1 65                     LISU  5
03E2 68                     LISL  0
03E3 16                     LM
03E4 5D                     LR    I,A
03E5 16                     LM
03E6 5C                     LR    S,A
03E7 280AC7 0AC7            PI    DCTOHX
03EA 280B52 0B52            PI    MTMPR     DIST CAL NUMBER
03ED 66                     LISU  6
03EE 68                     LISL  0
03EF 75                     LIS   5
03F0 5D                     LR    I,A       MPY RESULT BY 32
03F1 67                     LISU  7
03F2 280AFB 0AFB            PI    NRMLZ
03F5 280B5A 0B5A            PI    SUBEXP
03F8 67                     LISU  7
03F9 6B                     LISL  3
03FA 280AFB 0AFB            PI    NRMLZ
03FD 280B5A 0B5A            PI    SUBEXP
0400 280B6F 0B6F            PI    MULBIN
0403 280B1C 0B1C            PI    SHRES
0406 280B67 0B67            PI    MRTMCD
0409 69                     LISL  1
040A 67               TM13  LISU  7         SAVE RESULT
040B 4C                     LR    A,S
040C 63                     LISU  3
040D 5E                     LR    D,A
040E 8FFB   040A            BR7   TM13
0410 2A0DF9 0DF9            DCI   SPFUD
0413 280CD9 0CD9            PI    LDFUD     LOAD K FOR SPEED READOUT
0416 280B6F 0B6F            PI    MULBIN
0419 280ABB 0ABB            PI    MRTST
041C 280BFD 0BFD            PI    BNTDC
041F 2A0FFE 0FFE            DCI   H'FFE'
0422 68                     LISL  0
0423 4D                     LR    A,I
0424 17                     ST
0425 4C                     LR    A,S
0426 17                     ST              SAVE SPEED RESULT
                      *
0427 62                     LISU  2         NO ACC UPDATES
0428 6F                     LISL  7          IF CHKSM BAD
0429 74                     LIS   4
042A FC                     NS    S
042B 840A   0436            BZ    IOFJ
042D 2A0FF5 0FF5            DCI   H'FF5'
```

```
0430 A5            0755            INS   5         IS IMPL DOWN?
0431 8C            0756            XM
0432 2120          0757            NI    H'20'
0434 8404    0439  0758            BZ    *+5
0436 2904E3  04E3  0759   IOFJ     JMP   IMPOFF    IF NOT, SKIP AHEAD
0439 280CD0  0CD0  0760            PI    MDTMCD
043C 69            0761            LISL  1         COMPUTE INCR DISTANCE
043D 280AFB  0AFB  0762            PI    NRMLZ
0440 66            0763            LISU  6
0441 68            0764            LISL  0
0442 42            0765            LR    A,2
0443 18            0766            COM
0444 1F            0767            INC
0445 5C            0768            LR    S,A
0446 2A0DFD  0DFD  0769            DCI   DSTFUD
0449 280CE7  0CE7  0770            PI    LDEFUD    LOAD K TO CONVERT TO DIST
044C 280B6F  0B6F  0771            PI    MULBIN
044F 280B1C  0B1C  0772            PI    SHRES
0452 280ABB  0ABB  0773            PI    MRTST
0455 280BFD  0BFD  0774            PI    BNTDC     CONV TO XX.XX FEET/METERS
0458 2A0FF1  0FF1  0775            DCI   H'FF1'
045B 2066          0776            LI    H'66'
045D 88            0777            AM
045E 68            0778            LISL  0
045F DC            0779            ASD   S
0460 5D            0780            LR    I,A
0461 2066          0781            LI    H'66'
0463 19            0782            LNK
0464 DC            0783            ASD   S
0465 5E            0784            LR    D,A       ADD TO PREV FRACT. DIST
0466 20FF          0785            LI    -1
0468 8E            0786            ADC
0469 4D            0787            LR    A,I
046A 17            0788            ST              SAVE NEW FRACT.DIST
046B 2A0FD2  0FD2  0789            DCI   H'FD2'
046E 2066          0790            LI    H'66'     NOW ADD TO DIST ACC
0470 CC            0791            AS    S
0471 89            0792            AMD
0472 5E            0793            LR    D,A
0473 2066          0794            LI    H'66'
0475 19            0795            LNK
0476 89            0796            AMD
0477 5D            0797            LR    I,A
0478 2A0FD2  0FD2  0798            DCI   H'FD2'
047B 280CF8  0CF8  0799            PI    CKST      STORE NEW VALUE,
                   0800   *                         WITH CHECKSUM
047E 280CD0  0CD0  0801            PI    MDTMCD
0481 69            0802            LISL  1         COMPUTE INCR AREA
0482 280AFB  0AFB  0803            PI    NRMLZ
0485 66            0804            LISU  6
0486 68            0805            LISL  0         GET DIST COUNTS
0487 42            0806            LR    A,2
0488 18            0807            COM
0489 1F            0808            INC
048A 5C            0809            LR    S,A
048B 2A0FCC  0FCC  0810            DCI   H'FCC'    LOAD WIDTH
048E 65            0811            LISU  5
048F 16            0812            LM
0490 5D            0813            LR    I,A
0491 16            0814            LM
0492 5C            0815            LR    S,A
0493 280AC7  0AC7  0816            PI    DCTOHX
0496 280B52  0B52  0817            PI    MTMPR
0499 6B            0818            LISL  3
049A 280AFB  0AFB  0819            PI    NRMLZ
049D 280B5A  0B5A  0820            PI    SUBEXP
04A0 280B6F  0B6F  0821            PI    MULBIN
04A3 2A0DF3  0DF3  0822            DCI   ARFUD     GET K TO YIELD
04A6 280CE7  0CE7  0823            PI    LDEFUD     H'1000' FOR
04A9 280B67  0B67  0824            PI    MRTMCD     .1 ACRE OR HECTARE
```

```
04AC 280B6F 0B6F 0825          PI    MULBIN
04AF 280B1C 0B1C 0826          PI    SHRES
04B2 67          0827          LISU  7
04B3 6E          0828          LISL  6
04B4 4E          0829          LR    A,D
04B5 52          0830          LR    2,A
04B6 4C          0831          LR    A,S
04B7 53          0832          LR    3,A      ADD THIS TO ALL AREA ACC'S
04B8 66          0833          LISU  6
04B9 69          0834          LISL  1
04BA 4D          0835 TM14     LR    A,I
04BB 4C          0836          LR    A,S
04BC C3          0837          AS    3
04BD 5D          0838          LR    I,A
04BE 4C          0839          LR    A,S
04BF 19          0840          LNK
04C0 C2          0841          AS    2
04C1 5C          0842          LR    S,A
04C2 8FF7   04BA 0843          BR7   TM14
04C4 6B          0844          LISL  3
04C5 2060        0845          LI    H'60'    IF > 1 ACRE/HECTARE,
04C7 CC          0846          AS    S         INCR TOTAL AREA
04C8 920A   04D3 0847          BNC   TM15
04CA 5C          0848          LR    S,A      SUB FROM ACC
04CB 71          0849          LIS   1
04CC 2A0FD8 0FD8 0850          DCI   H'FD8'
04CF 52          0851          LR    2,A
04D0 280D0A 0D0A 0852          PI    ADAREA
04D3 66          0853 TM15     LISU  6
04D4 6D          0854          LISL  5
04D5 4C          0855          LR    A,S
04D6 14          0856          SR    4
04D7 840B   04E3 0857          BZ    IMPOFF
04D9 52          0858          LR    2,A
04DA 7F          0859          LIS   H'F'
04DB FC          0860          NS    S
04DC 5C          0861          LR    S,A
04DD 2A0FD5 0FD5 0862          DCI   H'FD5'
04E0 280D0A 0D0A 0863          PI    ADAREA
                 0864 *
04E3 63          0865 IMPOFF   LISU  3
04E4 6A          0866          LISL  2
04E5 4D          0867          LR    A,I
04E6 52          0868          LR    2,A      DO RPM COMPUTATION
04E7 4C          0869          LR    A,S
04E8 67          0870          LISU  7
04E9 5E          0871          LR    D,A
04EA 42          0872          LR    A,2
04EB 5D          0873          LR    I,A
04EC CC          0874          AS    S
04ED 19          0875          LNK              BOTH ZERO?
04EE 62          0876          LISU  2
04EF 6D          0877          LISL  5
04F0 8406   04F7 0878          BZ    IMP1
04F2 20DF        0879          LI    H'DF'    RESET 'NO RPM' FLAG
04F4 FC          0880          NS    S
04F5 9004   04FA 0881          BR    IMP2
04F7 4C          0882 IMP1     LR    A,S
04F8 2220        0883          OI    H'20'    SET 'NO RPM' FLAG
04FA 5C          0884 IMP2     LR    S,A
04FB 2A0FC9 0FC9 0885          DCI   H'FC9'
04FE 65          0886          LISU  5
04FF 68          0887          LISL  0        LOAD RPM CONSTANT
0500 16          0888          LM
0501 5D          0889          LR    I,A
0502 16          0890          LM
0503 5C          0891          LR    S,A
0504 280AC7 0AC7 0892          PI    DCTOHX
0507 280B46 0B46 0893          PI    MTMCD
050A 6B          0894          LISL  3
```

```
050B 280AFB 0AFB          PI    NRMLZ
050E 66                   LISU  6
050F 68                   LISL  0
0510 42                   LR    A,2
0511 18                   COM
0512 240B                 AI    11        2↑N FUDGE FOR RPM
0514 5D                   LR    I,A
0515 67                   LISU  7
0516 280AFB 0AFB          PI    NRMLZ
0519 280B5A 0B5A          PI    SUBEXP
051C 280B6F 0B6F          PI    MULBIN
051F 280B1C 0B1C          PI    SHRES     HERE'S RPM
0522 280ABB 0ABB          PI    MRTST
0525 280BFD 0BFD          PI    BNTDC
0528 2A0FFC 0FFC          DCI   H'FFC'
052B 68                   LISL  0
052C 4D                   LR    A,I
052D 17                   ST
052E 4C                   LR    A,S
052F 17                   ST
                    *
0530 63                   LISU  3
0531 69                   LISL  1
0532 A5                   INS   5
0533 810F   0543          BP    IMP3      LOAD DIST OR SLIP DIST
0535 6D                   LISL  5
0536 70                   CLR
0537 CE                   AS    D
0538 9409   0542          BNZ   IMP4      IF NOT >100, SKIP COMP
053A 4C                   LR    A,S
053B 2564                 CI    100
053D 9204   0542          BNC   IMP4
053F 29062B 062B          JMP   IMP5
0542 6F             IMP4  LISL  7
0543 4E             IMP3  LR    A,D
0544 52                   LR    2,A
0545 4C                   LR    A,S
0546 67                   LISU  7
0547 68                   LISL  0
0548 5D                   LR    I,A
0549 42                   LR    A,2
054A 5E                   LR    D,A
054B 62                   LISU  2
054C 6F                   LISL  7
054D 20F7                 LI    H'F7'
054F FC                   NS    S
0550 5D                   LR    I,A
0551 63                   LISU  3
0552 4D                   LR    A,I
0553 14                   SR    4
0554 CC                   AS    S
0555 67                   LISU  7
0556 19                   LNK
0557 940A   0562          BNZ   LAB
0559 2A0FFA 0FFA          DCI   H'FFA'
055C 17                   ST
055D 17                   ST
055E 52                   LR    2,A
055F 290627 0627          JMP   SLBOV
0562 280B17 0B17    LAB   PI    NRM14
0565 66                   LISU  6
0566 68                   LISL  0
0567 42                   LR    A,2
0568 18                   COM
0569 1F                   INC
056A 5C                   LR    S,A
056B A5                   INS   5
056C 63                   LISU  3
056D 6A                   LISL  2
056E 8102   0571          BP    *+3
0570 6C                   LISL  4         LOAD DIFF OR RPM COUNTS
```

```
0571 4D                  LR    A,I
0572 52                  LR    2,A
0573 4C                  LR    A,S
0574 67                  LISU  7
0575 6B                  LISL  3
0576 5E                  LR    D,A
0577 42                  LR    A,2
0578 5D                  LR    I,A
0579 280B17 0B17         PI    NRM14
057C 280B63 0B63         PI    ADDEXP
057F 280BB5 0BB5         PI    DIVBIN    COMPUTE DIST (RPM OR DIFF)
0582 280B67 0B67         PI    MRTMCD
0585 66                  LISU  6
0586 68                  LISL  0
0587 4D                  LR    A,I
0588 5C                  LR    S,A       SAVE 2↑N
0589 67                  LISU  7
058A 6E                  LISL  6
058B 280AFB 0AFB         PI    NRMLZ     SAVE 8 MSBITS
058E 280B5A 0B5A         PI    SUBEXP
0591 67                  LISU  7
0592 6E                  LISL  6
0593 4C                  LR    A,S
0594 65                  LISU  5
0595 5C                  LR    S,A       SAVE AS ZERO-SLIP K
0596 66                  LISU  6
0597 68                  LISL  0
0598 4E                  LR    A,D
0599 65                  LISU  5
059A 5C                  LR    S,A
059B 66                  LISU  6
059C 69                  LISL  1
059D 4E                  LR    A,D
059E 5D                  LR    I,A       RESTORE 2↑N AND CONTINUE
059F 67                  LISU  7
05A0 280B17 0B17         PI    NRM14
05A3 280B5A 0B5A         PI    SUBEXP
05A6 A5                  INS   5
05A7 71                  LIS   1
05A8 9106   05AF         BM    SLP1
05AA 2A0FF4 0FF4         DCI   H'FF4'    IF NOT DIFFINEN GET RANGE
05AD 7F                  LIS   H'F'
05AE 8A                  NM
05AF 2A0FDF 0FDF   SLP1  DCI   H'FDF'
05B2 13                  SL    1
05B3 8E                  ADC             PT TO SELECTED SLIP K
05B4 67                  LISU  7
05B5 6A                  LISL  2
05B6 16                  LM
05B7 5D                  LR    I,A
05B8 70                  CLR
05B9 5C                  LR    S,A
05BA 16                  LM
05BB 18                  COM
05BC 1F                  INC
05BD 66                  LISU  6
05BE 68                  LISL  0
05BF CC                  AS    S
05C0 5C                  LR    S,A
05C1 67                  LISU  7
05C2 6B                  LISL  3
05C3 280B17 0B17         PI    NRM14
05C6 280B63 0B63         PI    ADDEXP
05C9 280BB5 0BB5         PI    DIVBIN
05CC 280B67 0B67         PI    MRTMCD
05CF 69                  LISL  1
05D0 280AFB 0AFB         PI    NRMLZ
05D3 280B5A 0B5A         PI    SUBEXP
05D6 2A0E0D 0E0D         DCI   SLPFUD    CORRECTION FACTOR
05D9 280CF5 0CF5         PI    LD1FFE
05DC 280B6F 0B6F         PI    MULBIN
```

```
05DF 280B1C 0B1C              PI     SHRES
05E2 67                       LISU   7
05E3 6D                       LISL   5
05E4 4C                       LR     A,S        COMPUTE 1-RADAR/WHEEL
05E5 18                       COM
05E6 2465                     AI     H'65'      SUBTRACT FROM H'64'
05E8 5D                       LR     I,A
05E9 70                       CLR
05EA 19                       LNK
05EB 52                       LR     2,A
05EC 4C                       LR     A,S
05ED 18                       COM
05EE C2                       AS     2
05EF 5E                       LR     D,A
05F0 8212   0603              BC     SLP2
05F2 4C                       LR     A,S        IF <0, COMP IT
05F3 18                       COM
05F4 1F                       INC
05F5 5D                       LR     I,A
05F6 70                       CLR
05F7 19                       LNK
05F8 52                       LR     2,A
05F9 4C                       LR     A,S
05FA 18                       COM
05FB C2                       AS     2
05FC 5E                       LR     D,A
05FD 62                       LISU   2
05FE 6F                       LISL   7          SET NEG SLIP FLAG
05FF 4C                       LR     A,S
0600 2208                     OI     8
0602 5C                       LR     S,A
0603 280ABB 0ABB        SLP2  PI     MRTST      HERE'S SLIP
0606 280BFD 0BFD              PI     BNTDC
0609 2A0FFA 0FFA              DCI    H'FFA'
060C 68                       LISL   0
060D 4D                       LR     A,I
060E 17                       ST
060F 4C                       LR     A,S
0610 17                       ST
0611 67                       LISU   7
0612 6E                       LISL   6          COMPUTE SLIP BARS
0613 7C                       LIS    12
0614 52                       LR     2,A
0615 70                       CLR
0616 CE                       AS     D
0617 940F   0627              BNZ    SLBOV      LIMIT TO 12
0619 4C                       LR     A,S
061A 251E                     CI     30
061C 920A   0627              BNC    SLBOV
061E 2A0E16 0E16              DCI    SLPTB
0621 8D                 SLB2  CM                CHECK 12 LIMITS
0622 9204   0627              BNC    SLBOV
0624 32                       DS     2
0625 94FB   0621              BNZ    SLB2
0627 66                 SLBOV LISU   6
0628 69                       LISL   1
0629 42                       LR     A,2
062A 5C                       LR     S,A        HERE'S SLIP BARS
062B 62                 IMP5  LISU   2
062C 6D                       LISL   5
062D 2A0FC6 0FC6              DCI    H'FC6'     CHECK SPEED ALARM
0630 16                       LM
0631 52                       LR     2,A
0632 16                       LM
0633 53                       LR     3,A
0634 C2                       AS     2
0635 19                       LNK               SKIP IF LIMIT = 0
0636 8414   064B              BZ     SPA1
0638 2A0FFE 0FFE              DCI    H'FFE'
063B 280D24 0D24              PI     CMPR
063E 820C   064B              BC     SPA1
```

```
0640 70                      CLR              SPEED > LIMIT
0641 CC                      AS      S
0642 910C     064F           BM      SPA2
0644 213F                    NI      H'3F'    RESET AL.INHIBIT
0646 2280                    OI      H'80'
0648 5C                      LR      S,A
0649 9005     064F           BR      SPA2
064B 4C             SPA1     LR      A,S      RESET ERROR FLAG
064C 13                      SL      1
064D 12                      SR      1
064E 5C                      LR      S,A
064F 6F             SPA2     LISL    7
0650 78                      LIS     8
0651 FC                      NS      S
0652 6D                      LISL    5
0653 943E     0692           BNZ     SLA1
0655 2A0FC0   0FC0           DCI     H'FC0'
0658 16                      LM               CHECK SLIP
0659 52                      LR      2,A
065A 16                      LM
065B 53                      LR      3,A
065C C2                      AS      2
065D 19                      LNK
065E 8433     0692           BZ      SLA1     SKIP IF = 0
0660 2A0FFA   0FFA           DCI     H'FFA'
0663 280D24   0D24           PI      CMPR
0666 820D     0674           BC      SLA2
0668 4C                      LR      A,S      SLIP ERROR
0669 15                      SL      4
066A 4C                      LR      A,S
066B 8103     066F           BP      *+4
066D 21BF                    NI      H'BF'    RESET AL.INH
066F 21E7                    NI      H'E7'    SLIP AND SLIP-3 ACTIVE
0671 5C                      LR      S,A
0672 9023     0696           BR      SLA3
0674 20FD           SLA2     LI      H'FD'
0676 D2                      ASD     2
0677 52                      LR      2,A      SUBTRACT 3% FROM LIMIT
0678 8204     067D           BC      SLA4
067A 33                      DS      3
067B 920E     068A           BNC     SLA5     IF <0 FORGET IT
067D 2A0FFA   0FFA  SLA4     DCI     H'FFA'
0680 280D24   0D24           PI      CMPR
0683 8206     068A           BC      SLA5
0685 4C                      LR      A,S
0686 21EF                    NI      H'EF'
0688 9004     068D           BR      SLA6
068A 4C             SLA5     LR      A,S
068B 2210                    OI      H'10'
068D 2208           SLA6     OI      8
068F 5C                      LR      S,A
0690 9005     0696           BR      SLA3
0692 4C             SLA1     LR      A,S
0693 2218                    OI      H'18'
0695 5C                      LR      S,A
0696 2A0FC3   0FC3  SLA3     DCI     H'FC3'
0699 16                      LM               CHECK RPM ALARM
069A 52                      LR      2,A
069B 16                      LM
069C 53                      LR      3,A
069D C2                      AS      2
069E 19                      LNK
069F 8420     06C0           BZ      RPA1     ALARM PT 0?
06A1 2A0FFC   0FFC           DCI     H'FFC'
06A4 280D24   0D24           PI      CMPR
06A7 9218     06C0           BNC     RPA1
06A9 20FE                    LI      H'FE'
06AB D3                      ASD     3
06AC 53                      LR      3,A
06AD 9209     06B7           BNC     RPA2
06AF 2A0FFC   0FFC           DCI     H'FFC'
```

```
06B2 280D24 0D24          PI    CMPR
06B5 820A   06C0          BC    RPA1
06B7 74           RPA2    LIS   4         WITHIN RPM BAND
06B8 FC                   NS    S
06B9 840A   06C4          BZ    TM5C
06BB 4C                   LR    A,S
06BC 21BB                 NI    H'BB'
06BE 9004   06C3          BR    RPA4
06C0 4C           RPA1    LR    A,S
06C1 2204                 OI    4
06C3 5C           RPA4    LR    S,A
                  *
06C4 62           TM5C    LISU  2
06C5 69                   LISL  1
06C6 70                   CLR
06C7 CC                   AS    S         READY FOR 5 SEC TASKS?
06C8 8404   06CD          BZ    *+5
06CA 2907D5 07D5          JMP   TM41
06CD 2014                 LI    20
06CF 5C                   LR    S,A       PRESET COUNTER TO 20
06D0 66                   LISU  6
06D1 6E                   LISL  6
06D2 4D                   LR    A,I       DO RATE FUNCTIONS
06D3 52                   LR    2,A
06D4 4C                   LR    A,S
06D5 67                   LISU  7
06D6 69                   LISL  1
06D7 5E                   LR    D,A
06D8 42                   LR    A,2
06D9 5D                   LR    I,A
06DA 280AFB 0AFB          PI    NRMLZ
06DD 66                   LISU  6
06DE 68                   LISL  0
06DF 42                   LR    A,2
06E0 18                   COM
06E1 1F                   INC
06E2 5C                   LR    S,A
06E3 2A0E0A 0E0A          DCI   CRATFD
06E6 280CF5 0CF5          PI    LD1FFE
06E9 280B6F 0B6F          PI    MULBIN
06EC 280B1C 0B1C          PI    SHRES
06EF 280ABB 0ABB          PI    MRTST
06F2 280BFD 0BFD          PI    BNTDC
06F5 2A0FF8 0FF8          DCI   H'FF8'    CURRENT RATE VALUE
06F8 68                   LISL  0
06F9 4D                   LR    A,I
06FA 17                   ST
06FB 4C                   LR    A,S
06FC 17                   ST
06FD 2A0FDE 0FDE          DCI   H'FDE'
0700 16                   LM
0701 1F                   INC
0702 5E                   LR    D,A
0703 16                   LM
0704 19                   LNK
0705 5C                   LR    S,A       INCREMENT AVG.RATE
0706 13                   SL    1          TIME ACC
0707 812A   0732          BP    TM51      IF IT EXCEEDS 14 BITS,
0709 2020                 LI    H'20'
070B 5D                   LR    I,A       SHIFT TIME AND AREA
070C 70                   CLR             ACC'S RIGHT ONCE
070D 5C                   LR    S,A
070E 53                   LR    3,A
070F 1A                   DI
0710 2A0FDC 0FDC          DCI   H'FDC'
0713 280D35 0D35          PI    SHRT
0716 2A0FDB 0FDB          DCI   H'FDB'
0719 280D35 0D35          PI    SHRT
071C 2A0FF3 0FF3          DCI   H'FF3'
071F 280D35 0D35          PI    SHRT
```

```
0722 2A0FF2 0FF2          DCI    H'FF2'
0725 280D35 0D35          PI     SHRT
0728 2A0FDB 0FDB          DCI    H'FDB'    UPDATE CHECKSUM
072B 16                   LM
072C 88                   AM
072D 18                   COM
072E 2456                 AI     H'56'
0730 17                   ST
0731 1B                   EI
0732 2A0FDE 0FDE   TM51   DCI    H'FDE'
0735 280CF8 0CF8          PI     CKST      UPDATE TIME
0738 66                   LISU   6
0739 6E                   LISL   6
073A 2A0FF2 0FF2          DCI    H'FF2'
073D 16                   LM
073E CD                   AS     I
073F 52                   LR     2,A       ADD NEW AREA
0740 4C                   LR     A,S
0741 19                   LNK
0742 88                   AM
0743 53                   LR     3,A
0744 70                   CLR
0745 5E                   LR     D,A
0746 5C                   LR     S,A       CLEAR INC AREA
0747 2A0FF2 0FF2          DCI    H'FF2'
074A 42                   LR     A,2
074B 17                   ST
074C 43                   LR     A,3
074D 17                   ST
074E 9212   0761          BNC    TM52
0750 2A0FDB 0FDB          DCI    H'FDB'    INCREMENT HI AREA ACC
0753 65                   LISU   5
0754 69                   LISL   1
0755 16                   LM
0756 1F                   INC
0757 5E                   LR     D,A
0758 16                   LM
0759 19                   LNK
075A 5C                   LR     S,A
075B 2A0FDB 0FDB          DCI    H'FDB'
075E 280CF8 0CF8          PI     CKST
0761 2A0FDC 0FDC   TM52   DCI    H'FDC'
0764 70                   CLR
0765 52                   LR     2,A
0766 67                   LISU   7         DO AREA/TIME COMP
0767 68                   LISL   0
0768 88                   AM
0769 9427   0791          BNZ    TM53
076B 2A0FDB 0FDB          DCI    H'FDB'
076E 16                   LM
076F 253F                 CI     H'3F'     SKIP HI ZERO BYTES
0771 921F   0791          BNC    TM53
0773 13                   SL     1
0774 78                   LIS    8
0775 52                   LR     2,A
0776 9411   0788          BNZ    TM54      R2 IS 2↑N
0778 2A0FF3 0FF3          DCI    H'FF3'
077B 16                   LM
077C 253F                 CI     H'3F'
077E 9209   0788          BNC    TM54
0780 2010                 LI     16
0782 52                   LR     2,A
0783 2A0FF2 0FF2          DCI    H'FF2'
0786 900D   0794          BR     TM56
0788 2A0FF3 0FF3   TM54   DCI    H'FF3'
078B 16                   LM
078C 2A0FDB 0FDB          DCI    H'FDB'
078F 9005   0795          BR     TM55
0791 2A0FDB 0FDB   TM53   DCI    H'FDB'
0794 16            TM56   LM
0795 5D            TM55   LR     I,A
```

```
0796 16                        LM
0797 5C                        LR     S,A
0798 66                        LISU   6
0799 68                        LISL   0
079A 42                        LR     A,2
079B 18                        COM
079C 1F                        INC
079D 5C                        LR     S,A
079E 67                        LISU   7
079F 69                        LISL   1
07A0 280B17 0B17               PI     NRM14
07A3 280B5A 0B5A               PI     SUBEXP
07A6 2A0FDE 0FDE               DCI    H'FDE'       LOAD TIME
07A9 67                        LISU   7
07AA 6A                        LISL   2
07AB 16                        LM
07AC 5D                        LR     I,A
07AD 16                        LM
07AE 5C                        LR     S,A
07AF 280B17 0B17               PI     NRM14
07B2 280B63 0B63               PI     ADDEXP
07B5 280BB5 0BB5               PI     DIVBIN
07B8 280B67 0B67               PI     MRTMCD
07BB 2A0E07 0E07               DCI    ARATFD       CORR FACTOR
07BE 280CF5 0CF5               PI     LD1FFE       FOR AVG RATE
07C1 280B6F 0B6F               PI     MULBIN
07C4 280B1C 0B1C               PI     SHRES
07C7 280ABB 0ABB               PI     MRTST
07CA 280BFD 0BFD               PI     BNTDC
07CD 2A0FF6 0FF6               DCI    H'FF6'
07D0 68                        LISL   0
07D1 4D                        LR     A,I
07D2 17                        ST
07D3 4C                        LR     A,S          END OF 5 SEC TASKS
07D4 17                        ST
07D5 62               TM41     LISU   2
07D6 6F                        LISL   7
07D7 72                        LIS    2            IS DO.DIST.AUTOCAL FLAG SET
07D8 FC                        NS     S
07D9 843E   0818               BZ     DSUP
07DB EC                        XS     S            RESET FLAG
07DC 5E                        LR     D,A
07DD 64                        LISU   4            YES
07DE 4D                        LR     A,I
07DF 52                        LR     2,A
07E0 4C                        LR     A,S
07E1 67                        LISU   7
07E2 6B                        LISL   3
07E3 5E                        LR     D,A
07E4 42                        LR     A,2
07E5 5D                        LR     I,A
07E6 280B17 0B17               PI     NRM14
07E9 66                        LISU   6
07EA 68                        LISL   0
07EB 42                        LR     A,2
07EC 5C                        LR     S,A
07ED 2A0E03 0E03               DCI    DCLFUD
07F0 A5                        INS    5            DIST CORR NUMBER
07F1 13                        SL     1
07F2 8103   07F6               BP     *+4          ENGL/METR
07F4 72                        LIS    2
07F5 8E                        ADC                 400 FEET OR
07F6 67                        LISU   7            150 METERS
07F7 68                        LISL   0
07F8 16                        LM
07F9 5D                        LR     I,A
07FA 16                        LM
07FB 5C                        LR     S,A
07FC 280BB5 0BB5               PI     DIVBIN
07FF 280B1C 0B1C               PI     SHRES
0802 280ABB 0ABB               PI     MRTST        HERE'S CAL NUMBER
```

```
0805 280BFD 0BFD 1391              PI     BNTDC
0808 68          1392              LISL   0
0809 4D          1393              LR     A,I
080A 52          1394              LR     2,A
080B 4E          1395              LR     A,D
080C 5D          1396              LR     I,A
080D 42          1397              LR     A,2
080E 5C          1398              LR     S,A       SWITCH 'EM
080F 2A0FCF 0FCF 1399              DCI    H'FCF'
0812 280CF8 0CF8 1400              PI     CKST
0815 2025        1401              LI     H'25'
0817 58          1402              LR     8,A       RESET ALLOW FLAG
0818 62          1403      DSUP    LISU   2
0819 6F          1404              LISL   7         CHECK FOR RESET PENDING
081A 2030        1405              LI     H'30'
081C FC          1406              NS     S
081D 8454   0872 1407              BZ     DSSUP
081F 4C          1408              LR     A,S
0820 21CF        1409              NI     H'CF'
0822 5C          1410              LR     S,A
0823 48          1411              LR     A,8
0824 14          1412              SR     4
0825 52          1413              LR     2,A
0826 72          1414              LIS    2
0827 F8          1415              NS     8
0828 8402   082B 1416              BZ     *+3
082A 7A          1417              LIS    10
082B C2          1418              AS     2
082C 2A0D7B 0D7B 1419              DCI    VTABLE
082F 8E          1420              ADC
0830 16          1421              LM
0831 2A0FC0 0FC0 1422              DCI    H'FC0'
0834 8E          1423              ADC
0835 70          1424              CLR
0836 1A          1425              DI
0837 17          1426              ST
0838 17          1427              ST
0839 2055        1428              LI     H'55'
083B 17          1429              ST
083C 20F3        1430              LI     H'F3'
083E F8          1431              NS     8         IF AVG RATE CLR BOTH
083F 2561        1432              CI     H'61'
0841 9414   0856 1433              BNZ    FNCLR
0843 70          1434              CLR
0844 17          1435              ST
0845 17          1436              ST
0846 2055        1437              LI     H'55'
0848 17          1438              ST
0849 2A0FF2 0FF2 1439              DCI    H'FF2'
084C 70          1440              CLR
084D 17          1441              ST
084E 17          1442              ST
084F 2A0FF6 0FF6 1443              DCI    H'FF6'
0852 17          1444              ST
0853 17          1445              ST
0854 901C   0871 1446              BR     FNCL1
0856 2571        1447      FNCLR   CI     H'71'
0858 9408   0861 1448              BNZ    FNCL2
085A 6A          1449              LISL   2
085B 66          1450      FNCL3   LISU   6
085C 70          1451              CLR
085D 5D          1452              LR     I,A
085E 5C          1453              LR     S,A
085F 9011   0871 1454              BR     FNCL1
0861 2581        1455      FNCL2   CI     H'81'
0863 9404   0868 1456              BNZ    FNCL4
0865 6C          1457              LISL   4
0866 90F4   085B 1458              BR     FNCL3
0868 2591        1459      FNCL4   CI     H'91'
086A 9406   0871 1460              BNZ    FNCL1
086C 2A0FF1 0FF1 1461              DCI    H'FF1'
```

```
086F 70                    CLR
0870 17                    ST
0871 1B          FNCL1     EI
0872 280CC0 0CC0 DSSUP     PI     DISCLR     NOW DO DISPLAY UPDATE
0875 73                    LIS    3
0876 F8                    NS     8
0877 8416   088E           BZ     DSOPER
0879 2502                  CI     2
087B 840C   0888           BZ     DSALAR
087D 810D   088B           BP     DSPROG
087F 2A0DE7 0DE7 DSNOMG    DCI    MSNO       MODE IS NO
0882 280CC8 0CC8           PI     LDMSG
0885 290A62 0A62           JMP    DSU1
0888 290A45 0A45 DSALAR    JMP    DSAL1
088B 2909F8 09F8 DSPROG    JMP    DSPR1
088E 48          DSOPER    LR     A,8
088F 14                    SR     4          OP MODE
0890 2504                  CI     4
0892 9412   08A5           BNZ    DS01
0894 63                    LISU   3          DISP TEST FUNCTION
0895 6F                    LISL   7
0896 20FF                  LI     H'FF'      ALL SEGMENTS ON
0898 5E                    LR     D,A
0899 8FFE   0898           BR7*   *-1
089B A5                    INS    5
089C 8105   08A2           BP     DSB1
089E 6C                    LISL   4          IF DIFF INP ENABLE,
089F 2080                  LI     H'80'       DON'T SHOW SLIP DIG
08A1 5C                    LR     S,A
08A2 290A62 0A62 DSB1      JMP    DSU1
08A5 2509        DS01      CI     9
08A7 825D   0905           BC     DS02
08A9 2A0DEB 0DEB           DCI    MSFAIL     FAIL FUNCTION
08AC 280CC8 0CC8           PI     LDMSG
08AF 62                    LISU   2
08B0 69                    LISL   1
08B1 71                    LIS    1
08B2 FC                    NS     S
08B3 52                    LR     2,A        BLANK BLINKERS?
08B4 70                    CLR
08B5 53                    LR     3,A
08B6 54                    LR     4,A
08B7 71                    LIS    1
08B8 55          DS03      LR     5,A        BLINK BAD LABELS
08B9 2504                  CI     4
08BB 9404   08C0           BNZ    *+5
08BD 76                    LIS    6          SKIP TEST AND RATE
08BE 90F9   08B8           BR     DS03
08C0 2A0D7B 0D7B           DCI    VTABLE     PT TO VALUE TO CHECK
08C3 8E                    ADC
08C4 16                    LM
08C5 2A0FC0 0FC0           DCI    H'FC0'
08C8 8E                    ADC
08C9 280D46 0D46           PI     CKSM5
08CC 841B   08E8           BZ     DS04
08CE 45                    LR     A,5
08CF 2509                  CI     9
08D1 9205   08D7           BNC    DS05
08D3 71                    LIS    1
08D4 53                    LR     3,A
08D5 9003   08D9           BR     DS06
08D7 71          DS05      LIS    1
08D8 54                    LR     4,A
08D9 70          DS06      CLR
08DA C2                    AS     2
08DB 940C   08E8           BNZ    DS04
08DD 45                    LR     A,5        TURN LABEL ON
08DE 2509                  CI     9
08E0 8203   08E4           BC     *+4
08E2 24F6                  AI     -10
08E4 56                    LR     6,A
```

```
08E5 280D4D 0D4D 1533        PI    LBLON
08E8 45          1534  DS04  LR    A,5
08E9 250C        1535        CI    12        DONE YET?
08EB 8404   08F0 1536        BZ    DS07
08ED 1F          1537        INC
08EE 90C9   08B8 1538        BR    DS03
08F0 70          1539  DS07  CLR
08F1 C3          1540        AS    3         ANY PROG FAILURES?
08F2 8406   08F9 1541        BZ    DS08
08F4 7B          1542        LIS   H'B'
08F5 56          1543        LR    6,A
08F6 280D4D 0D4D 1544        PI    LBLON
08F9 70          1545  DS08  CLR
08FA C4          1546        AS    4
08FB 8406   0902 1547        BZ    DS09
08FD 7C          1548        LIS   H'C'
08FE 56          1549        LR    6,A       ALARM MESSAGE
08FF 280D4D 0D4D 1550        PI    LBLON
0902 290A62 0A62 1551  DS09  JMP   DSU1
                 1552  *
0905 62          1553  DS02  LISU  2
0906 6F          1554        LISL  7
0907 70          1555        CLR
0908 CC          1556        AS    S
0909 811E   0928 1557        BP    DSX1
090B 79          1558        LIS   9         P2 HELD
090C 56          1559        LR    6,A       TURN ON ALL FUNCTION LABELS
090D 280D4D 0D4D 1560  DSX2  PI    LBLON
0910 36          1561        DS    6
0911 82FB   090D 1562        BC    DSX2
0913 62          1563        LISU  2
0914 69          1564        LISL  1
0915 71          1565        LIS   1
0916 FC          1566        NS    S
0917 84EA   0902 1567        BZ    DS09
0919 48          1568        LR    A,8       BLANK SELECTED FUNCTION LAB
091A 14          1569        SR    4
091B 13          1570        SL    1
091C 2A0D9B 0D9B 1571        DCI   MTABLE
091F 8E          1572        ADC
0920 16          1573        LM
0921 0B          1574        LR    IS,A
0922 4C          1575        LR    A,S
0923 8C          1576        XM
0924 5C          1577        LR    S,A
0925 290A62 0A62 1578        JMP   DSU1
0928 66          1579  DSX1  LISU  6
0929 69          1580        LISL  1
092A 4C          1581        LR    A,S
092B 52          1582        LR    2,A       DISP SLIP BARS
092C 63          1583        LISU  3
092D 6D          1584        LISL  5
092E 2508        1585        CI    8
0930 8207   0938 1586        BC    DSX3
0932 24F8        1587        AI    -8        MORE THAN 8
0934 52          1588        LR    2,A
0935 20FF        1589        LI    H'FF'
0937 5D          1590        LR    I,A
0938 70          1591  DSX3  CLR
0939 C2          1592        AS    2
093A 840A   0945 1593        BZ    DSX5
093C 71          1594        LIS   1
093D 53          1595  DSX4  LR    3,A       TURN (R2) BARS ON
093E EC          1596        XS    S
093F 5C          1597        LR    S,A
0940 43          1598        LR    A,3
0941 13          1599        SL    1
0942 32          1600        DS    2
0943 94F9   093D 1601        BNZ   DSX4
0945 A5          1602  DSX5  INS   5
0946 910B   0952 1603        BM    DSOP1
```

```
0948 2A0FF4 0FF4           DCI   H'FF4'
094B 7F                    LIS   H'F'      SLIP RANGE DIGIT
094C 8A                    NM
094D 52                    LR    2,A
094E 6C                    LISL  4
094F 280D5A 0D5A           PI    DECODE
0952 2A0FF5 0FF5   DSOP1   DCI   H'FF5'
0955 A5                    INS   5
0956 8C                    XM
0957 2120                  NI    H'20'
0959 8406   0960           BZ    DSOP2
095B 7A                    LIS   10        IMPL UP MESSAGE
095C 56                    LR    6,A
095D 280D4D 0D4D           PI    LBLON
0960 48            DSOP2   LR    A,8
0961 14                    SR    4
0962 56                    LR    6,A
0963 62                    LISU  2
0964 69                    LISL  1         FLASH ALARM MESSAGE
0965 71                    LIS   1          IF IT IS THE
0966 FC                    NS    S          SELECTED FUNCTION
0967 841B   0983           BZ    DSP2X
0969 46                    LR    A,6
096A 2502                  CI    2
096C 9216   0983           BNC   DSP2X
096E 6D                    LISL  5
096F 840A   097A           BZ    DXXS
0971 13                    SL    1
0972 840D   0980           BZ    DXXL
0974 74                    LIS   4         RPM MODE SELECTED
0975 FC            DXXY    NS    S
0976 840F   0986   DXXX    BZ    DSP2Y     IS ALARM FLAG ON?
0978 900A   0983           BR    DSP2X
097A 4C            DXXS    LR    A,S
097B 18                    COM
097C 2180                  NI    H'80'
097E 90F7   0976           BR    DXXX
0980 78            DXXL    LIS   8
0981 90F3   0975           BR    DXXY
0983 280D4D 0D4D   DSP2X   PI    LBLON     FUNCTION MESSAGE
0986 62            DSP2Y   LISU  2
0987 69                    LISL  1
0988 71                    LIS   1
0989 FC                    NS    S
098A 9422   09AD           BNZ   DSOP3
098C 62                    LISU  2         ALARM MESSAGES
098D 6D                    LISL  5
098E 74                    LIS   4
098F FC                    NS    S
0990 9406   0997           BNZ   DSOP4
0992 71                    LIS   1         RPM
0993 56                    LR    6,A
0994 280D4D 0D4D           PI    LBLON
0997 62            DSOP4   LISU  2
0998 6D                    LISL  5
0999 70                    CLR
099A CC                    AS    S
099B 8106   09A2           BP    DSOP5
099D 72                    LIS   2
099E 56                    LR    6,A       SPEED
099F 280D4D 0D4D           PI    LBLON
09A2 62            DSOP5   LISU  2
09A3 6D                    LISL  5
09A4 4C                    LR    A,S
09A5 15                    SL    4
09A6 9106   09AD           BM    DSOP3
09A8 70                    CLR
09A9 56                    LR    6,A
09AA 280D4D 0D4D           PI    LBLON     SLIP
                   *
09AD 70            DSOP3   CLR
```

```
09AE 2A0DB5 0DB5  DSZ1    DCI   LTABLE   VALUE TO DISPLAY
09B1 8E                   ADC
09B2 48                   LR    A,8
09B3 14                   SR    4
09B4 13                   SL    1
09B5 8E                   ADC
09B6 16                   LM
09B7 52                   LR    2,A
09B8 A5                   INS   5
09B9 13                   SL    1
09BA 16                   LM
09BB 8102   09BE          BP    *+3
09BD 14                   SR    4
09BE 53                   LR    3,A
09BF 2A0FC0 0FC0          DCI   H'FC0
09C2 42                   LR    A,2
09C3 8E                   ADC
09C4 16                   LM
09C5 54                   LR    4,A
09C6 16                   LM
09C7 55                   LR    5,A      HI BYTE
09C8 6B                   LISL  3
09C9 45                   LR    A,5      DISPLAY NUMBER
09CA 14                   SR    4
09CB 52                   LR    2,A
09CC 280D65 0D65          PI    NUMOUT
09CF 6A                   LISL  2
09D0 7F                   LIS   H'F'
09D1 F5                   NS    5
09D2 52                   LR    2,A
09D3 280D65 0D65          PI    NUMOUT
09D6 69                   LISL  1
09D7 44                   LR    A,4
09D8 14                   SR    4
09D9 52                   LR    2,A
09DA 280D65 0D65          PI    NUMOUT
09DD 68                   LISL  0
09DE 7F                   LIS   H'F'
09DF F4                   NS    4
09E0 52                   LR    2,A
09E1 280D65 0D65          PI    NUMOUT
09E4 73                   LIS   3
09E5 F3                   NS    3
09E6 9404   09EB          BNZ   *+5
09E8 290A62 0A62  RETJX   JMP   DSU1
09EB 12                   SR    1
09EC 9408   09F5          BNZ   DSOP6
09EE 68                   LISL  0
09EF 4C           RETJY   LR    A,S
09F0 2280                 OI    H'80'    DEC PT
09F2 5C                   LR    S,A
09F3 90F4   09E8          BR    RETJX
09F5 69           DSOP6   LISL  1
09F6 90F8   09EF          BR    RETJY
                  *
09F8 7B           DSPR1   LIS   11
09F9 56                   LR    6,A
09FA 280D4D 0D4D          PI    LBLON
09FD 48                   LR    A,8      PROGRAM MODE
09FE 14                   SR    4
09FF 56                   LR    6,A
0A00 280D4D 0D4D          PI    LBLON
0A03 48                   LR    A,8
0A04 14                   SR    4
0A05 940E   0A14          BNZ   DSPR2
0A07 A5                   INS   5        SLIP MODE
0A08 910B   0A14          BM    DSPR2
0A0A 2A0FF4 0FF4          DCI   H'FF4'
0A0D 7F                   LIS   H'F'     DISP SLIP DIGIT
0A0E 8A                   NM
```

```
0A0F 52                         LR     2,A
0A10 6C                         LISL   4
0A11 280D5A 0D5A                PI     DECODE
0A14 48                 DSPR2   LR     A,8
0A15 15                         SL     4
0A16 810F   0A26                BP     DSPR3      DIST.AUTOCAL?
0A18 2A0DEF 0DEF                DCI    MSDASH
0A1B 280CC8 0CC8                PI     LDMSG
0A1E 7B                         LIS    11
0A1F 56                         LR     6,A
0A20 280D4D 0D4D                PI     LBLON
0A23 290A62 0A62                JMP    DSU1
0A26 48                 DSPR3   LR     A,8
0A27 14                         SR     4
0A28 8413   0A3C                BZ     DSPR4
0A2A 2506                       CI     6          CURSOR?
0A2C 840F   0A3C                BZ     DSPR4
0A2E 73                         LIS    3
0A2F 65                         LISU   5
0A30 6A                         LISL   2
0A31 FC                         NS     S
0A32 2A0D88 0D88                DCI    CURSTB
0A35 13                         SL     1
0A36 8E                         ADC
0A37 16                         LM
0A38 0B                         LR     IS,A
0A39 4C                         LR     A,S
0A3A 8B                         OM
0A3B 5C                         LR     S,A
0A3C 2014               DSPR4   LI     20
0A3E 2A0DB5 0DB5        DSZZ1   DCI    LTABLE
0A41 8E                         ADC
0A42 2909B2 09B2                JMP    DSZ1+4
                        *
0A45 7C                 DSAL1   LIS    12         ALARM MODE
0A46 56                         LR     6,A
0A47 280D4D 0D4D                PI     LBLON
0A4A 48                         LR     A,8
0A4B 14                         SR     4
0A4C 56                         LR     6,A
0A4D 280D4D 0D4D                PI     LBLON
0A50 73                         LIS    3
0A51 65                         LISU   5
0A52 6A                         LISL   2
0A53 FC                         NS     S
0A54 2A0D88 0D88                DCI    CURSTB
0A57 13                         SL     1
0A58 8E                         ADC
0A59 16                         LM
0A5A 0B                         LR     IS,A
0A5B 4C                         LR     A,S
0A5C 8B                         OM
0A5D 5C                         LR     S,A
0A5E 2028                       LI     40
0A60 90DD   0A3E                BR     DSZZ1
0A62 280C99 0C99        DSU1    PI     DISOUT     SHIFT DATA OUT
0A65 73                         LIS    3
0A66 F8                         NS     8
0A67 62                         LISU   2          ALARM CHECK
0A68 6D                         LISL   5
0A69 8407   0A71                BZ     ALOPER
0A6B 2503                       CI     3
0A6D 8444   0AB2                BZ     ALON
0A6F 902A   0A9A                BR     ALOFF
0A71 48                 ALOPER  LR     A,8
0A72 14                         SR     4
0A73 2509                       CI     9
0A75 8205   0A7B                BC     AL01
0A77 201E                       LI     H'1E'
0A79 903B   0AB5                BR     AL02
0A7B 2A0FF5 0FF5        AL01    DCI    H'FF5'
```

```
0A7E A5                        INS    5
0A7F 8C                        XM
0A80 2120                      NI     H'20'
0A82 8405    0A88              BZ     ALO3
0A84 201C                      LI     H'1C'
0A86 9031    0AB8              BR     ALEITH
0A88 4C                ALO3    LR     A,S
0A89 13                        SL     1
0A8A 910F    0A9A              BM     ALOFF
0A8C 69                        LISL   1
0A8D 4C                        LR     A,S
0A8E 2514                      CI     20          5 SEC COUNTER = 20
0A90 6D                        LISL   5
0A91 9408    0A9A              BNZ    ALOFF
0A93 208C                      LI     H'8C'
0A95 FC                        NS     S
0A96 250C                      CI     H'C'
0A98 9419    0AB2              BNZ    ALON
0A9A 73                ALOFF   LIS    3
0A9B F8                        NS     8
0A9C 840D    0AAA              BZ     ALOF1
0A9E 2020                      LI     H'20'
0AA0 FC                        NS     S
0AA1 8408    0AAA              BZ     ALOF1
0AA3 69                        LISL   1
0AA4 4C                        LR     A,S
0AA5 2514                      CI     20
0AA7 6D                        LISL   5
0AA8 8409    0AB2              BZ     ALON        BEEP IF RPM ZERO
0AAA 4C                ALOF1   LR     A,S
0AAB 21FD                      NI     H'FD'
0AAD 5C                        LR     S,A
0AAE 211C                      NI     H'1C'
0AB0 9007    0AB8              BR     ALEITH
0AB2 4C                ALON    LR     A,S
0AB3 2202                      OI     2
0AB5 5C                ALO2    LR     S,A
0AB6 211E                      NI     H'1E'
0AB8 B5                ALEITH  OUTS   5
0AB9 90FF    0AB9              BR     *           ALL DONE WITH COMP,DISP,ALA
                       *
                       *
                       *
0ABB 08                MRTST   LR     K,P         MOVE RESULT TO R 53,54
0ABC 67                        LISU   7
0ABD 6D                        LISL   5
0ABE 4D                        LR     A,I
0ABF 52                        LR     2,A
0AC0 4C                        LR     A,S
0AC1 65                        LISU   5
0AC2 6C                        LISL   4
0AC3 5E                        LR     D,A
0AC4 42                        LR     A,2
0AC5 5C                        LR     S,A
0AC6 0C                        PK
                       *
                       *
                       *
                       *
0AC7 08                DCTOHX  LR     K,P
0AC8 65                        LISU   5
0AC9 69                        LISL   1
0ACA 73                        LIS    3           DEC IN 50,51 TO BIN 53,54
0ACB 52                        LR     2,A
0ACC 2A0E10  0E10              DCI    HXCNV
0ACF 70                        CLR
0AD0 53                        LR     3,A
0AD1 54                        LR     4,A
0AD2 16                DCT1    LM                 DIG CNTR        2
0AD3 55                        LR     5,A         BIN RESULT LO   3
```

```
0AD4 16                         LM              BIN RESULT HI  4
0AD5 56                         LR     6,A      DIG VALUE  LO  5
0AD6 71                         LIS    1        DIG VALUE  HI  6
0AD7 F2                         NS     2        DIGIT          7
0AD8 8405    0ADE               BZ     DCT2
0ADA 4C                         LR     A,S
0ADB 14                         SR     4
0ADC 9003    0AE0               BR     DCT3
0ADE 7F              DCT2       LIS    H'F'
0ADF FE                         NS     D
0AE0 57              DCT3       LR     7,A
0AE1 840B    0AED               BZ     DCT4
0AE3 45              DCT5       LR     A,5
0AE4 C3                         AS     3
0AE5 53                         LR     3,A      BINARY ADD
0AE6 46                         LR     A,6
0AE7 19                         LNK
0AE8 C4                         AS     4
0AE9 54                         LR     4,A
0AEA 37                         DS     7
0AEB 94F7    0AE3               BNZ    DCT5
0AED 32              DCT4       DS     2
0AEE 94E3    0AD2               BNZ    DCT1
0AF0 7F                         LIS    H'F'
0AF1 FC                         NS     S        LAST DIGIT
0AF2 C3                         AS     3
0AF3 53                         LR     3,A
0AF4 44                         LR     A,4
0AF5 19                         LNK
0AF6 6C                         LISL   4
0AF7 5E                         LR     D,A
0AF8 43                         LR     A,3
0AF9 5C                         LR     S,A
0AFA 0C                         PK
                     *
0AFB 08              NRMLZ      LR     K,P      NORMALIZE OP AT IS, IS-1
0AFC 2080                       LI     H'80'
0AFE 53              NRM3       LR     3,A
0AFF 70                         CLR
0B00 52                         LR     2,A
0B01 CE                         AS     D
0B02 CD                         AS     I
0B03 19                         LNK
0B04 9402    0B07               BNZ    NRM1     CHECK FOR ZERO
0B06 0C              NRM2       PK
0B07 43              NRM1       LR     A,3
0B08 FE                         NS     D
0B09 94FC    0B06               BNZ    NRM2
0B0B 4C                         LR     A,S      SHIFT IT
0B0C CC                         AS     S
0B0D 5D                         LR     I,A
0B0E 4C                         LR     A,S
0B0F 19                         LNK
0B10 CC                         AS     S
0B11 5C                         LR     S,A
0B12 42                         LR     A,2
0B13 1F                         INC
0B14 52                         LR     2,A      KEEP NUMBER OF SHIFTS
0B15 90F1    0B07               BR     NRM1
0B17 08              NRM14      LR     K,P
0B18 20E0                       LI     H'E0'    NORMALIZE TO 14 BITS
0B1A 90E3    0AFE               BR     NRM3
                     *
                     *
0B1C 08              SHRES      LR     K,P      SHIFT RESULT TILL R60 IS ZE
0B1D 66                         LISU   6
0B1E 68                         LISL   0
0B1F 70                         CLR
0B20 CC                         AS     S
0B21 9402    0B24               BNZ    SHR1
0B23 0C              SHR4       PK              ZERO; RETURN
```

```
0B24 67                 SHR1    LISU  7
0B25 6D                         LISL  5
0B26 52                 SHR3    LR    2,A
0B27 8113        0B3B           BP    SHR2       LESS THAN ZERO; SHIFT RIGHT
0B29 4C                         LR    A,S
0B2A 12                         SR    1
0B2B 5D                         LR    I,A
0B2C 4E                         LR    A,D
0B2D 15                         SL    4
0B2E 12                         SR    1
0B2F 15                         SL    4
0B30 EC                         XS    S
0B31 5D                         LR    I,A
0B32 4C                         LR    A,S
0B33 12                         SR    1
0B34 5E                         LR    D,A
0B35 42                         LR    A,2
0B36 1F                         INC
0B37 84EB        0B23           BZ    SHR4
0B39 90EC        0B26           BR    SHR3
                        *
0B3B 4C                 SHR2    LR    A,S        >0; SHIFT LEFT
0B3C CC                         AS    S
0B3D 5D                         LR    I,A
0B3E 4C                         LR    A,S
0B3F 19                         LNK
0B40 CC                         AS    S
0B41 5E                         LR    D,A
0B42 32                         DS    2
0B43 94F7        0B3B           BNZ   SHR2
0B45 0C                         PK
                        *
                        *
                        *
0B46 08                 MTMCD   LR    K,P        MOVE BIN IN TO MPCAND REGIS
0B47 65                         LISU  5
0B48 6B                         LISL  3
0B49 4D                         LR    A,I
0B4A 52                         LR    2,A
0B4B 4C                         LR    A,S
0B4C 69                 MTM2    LISL  1
0B4D 67                 MTM1    LISU  7
0B4E 5E                         LR    D,A
0B4F 42                         LR    A,2
0B50 5C                         LR    S,A
0B51 0C                         PK
                        *
0B52 08                 MTMPR   LR    K,P        MOVE BIN IN TO MPIER REG
0B53 65                         LISU  5
0B54 6B                         LISL  3
0B55 4D                         LR    A,I
0B56 52                         LR    2,A
0B57 4E                         LR    A,D
0B58 90F4        0B4D           BR    MTM1
                        *
0B5A 08                 SUBEXP  LR    K,P        SUBTRACT R2 FROM 60
0B5B 42                         LR    A,2
0B5C 18                         COM
0B5D 1F                         INC
0B5E 66                 SBX1    LISU  6
0B5F 68                         LISL  0
0B60 CC                         AS    S
0B61 5C                         LR    S,A
0B62 0C                         PK
                        *
0B63 08                 ADDEXP  LR    K,P        ADD R2 TO 60
0B64 42                         LR    A,2
0B65 90F8        0B5E           BR    SBX1
                        *
0B67 08                 MRTMCD  LR    K,P        MOVE RESULT TO MPCAND
0B68 67                         LISU  7
```

```
0B69 6D          2028           LISL  5
0B6A 4D          2029           LR    A,I
0B6B 52          2030           LR    2,A
0B6C 4C          2031           LR    A,S
0B6D 90DE   0B4C 2032           BR    MTM2
                 2033  *
                 2034  *
0B6F 08          2035  MULBIN   LR    K,P       16 X 16 BINARY MULTIPLY
0B70 67          2036           LISU  7          16 RESULT
0B71 6C          2037           LISL  4         70,71 X 72,73 -> 75,76
0B72 2080        2038           LI    H'80'
0B74 5D          2039           LR    I,A       ROUND RESULT TO 16 BITS
0B75 70          2040           CLR
0B76 5D          2041           LR    I,A
0B77 5D          2042           LR    I,A
0B78 5C          2043           LR    S,A       CLEAR BOTTOM OF MPCAND
0B79 70          2044  MUL2     CLR
0B7A 6A          2045           LISL  2
0B7B CD          2046           AS    I
0B7C CC          2047           AS    S         IS MPIER ZERO YET?
0B7D 19          2048           LNK
0B7E 8435   0BB4 2049           BZ    MUL3
0B80 72          2050           LIS   2
0B81 52          2051           LR    2,A       NO...
0B82 6F          2052           LISL  7
0B83 4C          2053  MUL1     LR    A,S       SHIFT MPCAND RIGHT
0B84 12          2054           SR    1
0B85 5D          2055           LR    I,A
0B86 4E          2056           LR    A,D
0B87 15          2057           SL    4
0B88 12          2058           SR    1
0B89 15          2059           SL    4
0B8A EC          2060           XS    S
0B8B 5D          2061           LR    I,A
0B8C 32          2062           DS    2
0B8D 94F5   0B83 2063           BNZ   MUL1
0B8F 4C          2064           LR    A,S
0B90 12          2065           SR    1
0B91 5C          2066           LR    S,A
0B92 6B          2067           LISL  3         LOOK AT MSBIT OF MPIER
0B93 70          2068           CLR
0B94 CC          2069           AS    S
0B95 8114   0BAA 2070           BP    MUL4
0B97 6F          2071           LISL  7         WAS 1; ADD MPCAND TO RESULT
0B98 4C          2072           LR    A,S
0B99 6C          2073           LISL  4
0B9A CC          2074           AS    S
0B9B 5C          2075           LR    S,A
0B9C 68          2076           LISL  0
0B9D 4C          2077           LR    A,S
0B9E 19          2078           LNK
0B9F 8204   0BA4 2079           BC    MUL5      IF CARRY HERE, DON'T CHG
0BA1 6D          2080           LISL  5          RESULT BYTE
0BA2 CC          2081           AS    S
0BA3 5C          2082           LR    S,A
0BA4 69          2083  MUL5     LISL  1
0BA5 4C          2084           LR    A,S
0BA6 19          2085           LNK
0BA7 6E          2086           LISL  6
0BA8 CC          2087           AS    S
0BA9 5C          2088           LR    S,A       HI BYTE OF RESULT
0BAA 6A          2089  MUL4     LISL  2
0BAB 4C          2090           LR    A,S       SHIFT MPIER LEFT
0BAC CC          2091           AS    S
0BAD 5D          2092           LR    I,A
0BAE 4C          2093           LR    A,S
0BAF 19          2094           LNK
0BB0 CC          2095           AS    S
0BB1 5C          2096           LR    S,A
0BB2 90C6   0B79 2097           BR    MUL2      NEXT. . .
```

```
0BB4 0C        2098 MUL3    PK
               2099 *
               2100 *
0BB5 08        2101 DIVBIN  LR    K,P     14 / 14 -> 12 BIT RESULT
0BB6 67        2102         LISU  7
0BB7 6D        2103         LISL  5
0BB8 70        2104         CLR           CLEAR RESULT
0BB9 5D        2105         LR    I,A
0BBA 5D        2106         LR    I,A
0BBB 6A        2107         LISL  2       IF /0 RESULT IS 0
0BBC 4D        2108         LR    A,I
0BBD CC        2109         AS    S
0BBE 19        2110         LNK
0BBF 843C 0BFC 2111         BZ    DIV6
0BC1 7C        2112         LIS   12
0BC2 52        2113         LR    2,A     R2 IS BIT COUNTER
0BC3 9011 0BD5 2114         BR    DIV2    SKIP SHIFT FIRST TIME
0BC5 68        2115 DIV1    LISL  0
0BC6 4C        2116         LR    A,S
0BC7 CC        2117         AS    S       SHIFT NUMERATOR LEFT
0BC8 5D        2118         LR    I,A
0BC9 4C        2119         LR    A,S
0BCA 19        2120         LNK
0BCB CC        2121         AS    S
0BCC 5C        2122         LR    S,A
0BCD 6D        2123         LISL  5       SHIFT QUOTIENT LEFT
0BCE 4C        2124         LR    A,S
0BCF CC        2125         AS    S
0BD0 5D        2126         LR    I,A
0BD1 4C        2127         LR    A,S
0BD2 19        2128         LNK
0BD3 CC        2129         AS    S
0BD4 5C        2130         LR    S,A
0BD5 6A        2131 DIV2    LISL  2       SUBTRACT DIVISOR
0BD6 4C        2132         LR    A,S      FROM NUMERATOR
0BD7 18        2133         COM
0BD8 1F        2134         INC
0BD9 1A        2135         DI
0BDA 1E        2136         LR    J,W
0BDB 68        2137         LISL  0
0BDC CC        2138         AS    S
0BDD 53        2139         LR    3,A     LO BYTE OF RESULT
0BDE 9202 0BE1 2140         BNC   DIV3
0BE0 1E        2141         LR    J,W
0BE1 6B        2142 DIV3    LISL  3
0BE2 4C        2143         LR    A,S
0BE3 18        2144         COM
0BE4 1D        2145         LR    W,J
0BE5 19        2146         LNK
0BE6 1E        2147         LR    J,W
0BE7 69        2148         LISL  1
0BE8 CC        2149         AS    S
0BE9 8204 0BEE 2150         BC    DIV4    HI BYTE OF RESULT IN ACC
0BEB 1D        2151         LR    W,J
0BEC 920B 0BF8 2152         BNC   DIV5
0BEE 5E        2153 DIV4    LR    D,A     CARRY OUT! SAVE IT
0BEF 43        2154         LR    A,3
0BF0 5C        2155         LR    S,A
0BF1 71        2156         LIS   1       ADD 1 TO QUOTIENT
0BF2 6D        2157         LISL  5
0BF3 CC        2158         AS    S
0BF4 5D        2159         LR    I,A
0BF5 4C        2160         LR    A,S
0BF6 19        2161         LNK
0BF7 5C        2162         LR    S,A
0BF8 1B        2163 DIV5    EI
0BF9 32        2164         DS    2
0BFA 94CA 0BC5 2165         BNZ   DIV1
0BFC 0C        2166 DIV6    PK
               2167 *
               2168 *
```

```
0BFD 08              BNTDC   LR     K,P        BINARY TO DECIMAL CONVERSIO
0BFE 71                      LIS    1
0BFF 52                      LR     2,A        BINARY IN REG 53,54
0C00 70                      CLR                DEC RESULT IN 50,51
0C01 53                      LR     3,A
0C02 65                      LISU   5
0C03 68                      LISL   0          R2 ADDER LSB
0C04 5D                      LR     I,A        R3 ADDER MSB
0C05 5C                      LR     S,A
0C06 6C              BNT1    LISL   4
0C07 4E                      LR     A,D
0C08 CC                      AS     S
0C09 19                      LNK
0C0A 842B     0C36           BZ     BNT2       BINARY ZERO YET?
0C0C 71                      LIS    1
0C0D FC                      NS     S          LOOK AT LSBIT
0C0E 840D     0C1C           BZ     BNT3
0C10 68                      LISL   0          ADD ADDER TO BCD RESULT
0C11 2066                    LI     H'66'
0C13 CC                      AS     S
0C14 D2                      ASD    2
0C15 5D                      LR     I,A
0C16 43                      LR     A,3
0C17 19                      LNK               THIS ONLY WORKS BECAUSE
0C18 2466                    AI     H'66'       R3 CAN'T END IN 9
0C1A DC                      ASD    S
0C1B 5C                      LR     S,A
0C1C 6B              BNT3    LISL   3
0C1D 4C                      LR     A,S        SHIFT BINARY RIGHT
0C1E 12                      SR     1
0C1F 5D                      LR     I,A
0C20 4E                      LR     A,D
0C21 15                      SL     4
0C22 12                      SR     1
0C23 15                      SL     4
0C24 EC                      XS     S
0C25 5D                      LR     I,A
0C26 4C                      LR     A,S
0C27 12                      SR     1
0C28 5C                      LR     S,A
0C29 42                      LR     A,2
0C2A 2466                    AI     H'66'      MPY ADDER BY 2, DECIMAL
0C2C D2                      ASD    2
0C2D 52                      LR     2,A
0C2E 43                      LR     A,3
0C2F 19                      LNK
0C30 2466                    AI     H'66'
0C32 D3                      ASD    3
0C33 53                      LR     3,A
0C34 90D1     0C06           BR     BNT1
0C36 0C              BNT2    PK
                     *
                     *
0C37 62              CHKSUM  LISU   2          CHECKSUM VERIFY
0C38 6F                      LISL   7
0C39 71                      LIS    1
0C3A FC                      NS     S
0C3B 8405     0C41           BZ     CHK1
0C3D 71                      LIS    1
0C3E F8                      NS     8          IF ONLY CHECKING PROGRM
0C3F 9431     0C71           BNZ    CHK2        SKIP ALARM CHECKS
0C41 70              CHK1    CLR
0C42 06                      LR     QU,A
0C43 2A0FC0   0FC0           DCI    H'FC0'
0C46 16              CHK5    LM
0C47 88                      AM
0C48 88                      AM
0C49 2555                    CI     H'55'
0C4B 8415     0C61           BZ     CHK3
0C4D 71                      LIS    1
0C4E FC                      NS     S
```

```
0C4F 840D   0C5D          BZ     CHK4
0C51 7F           CHK8    LIS    H'F'      RETURN BAD FUNCTION
0C52 F8                   NS     8
0C53 58                   LR     8,A
0C54 02                   LR     A,QU
0C55 15                   SL     4
0C56 E8                   XS     8
0C57 58           CHK11   LR     8,A
0C58 2201                 OI     1
0C5A 2903A2 03A2          JMP    TMR9      RET NZ
0C5D 1F           CHK4    INC
0C5E 290092 0092          JMP    MCRET     RET NZ
0C61 02           CHK3    LR     A,QU
0C62 1F                   INC              NEXT. . .
0C63 06                   LR     QU,A
0C64 2503                 CI     3
0C66 94DF   0C46          BNZ    CHK5
0C68 71                   LIS    1         DONE WITH ALARMS
0C69 FC                   NS     S
0C6A 8406   0C71          BZ     CHK2
0C6C 73           CHK13   LIS    3         MODE = NO
0C6D 58                   LR     8,A
0C6E 2903A2 03A2          JMP    TMR9
0C71 70           CHK2    CLR
0C72 06           CHK9    LR     QU,A
0C73 2A0D7B 0D7B          DCI    VTABLE
0C76 8E                   ADC
0C77 70                   CLR
0C78 88                   AM
0C79 8412   0C8C          BZ     CHK7      NO CHECK IF ZERO
0C7B 2A0FC0 0FC0          DCI    H'FC0'
0C7E 8E                   ADC
0C7F 16                   LM
0C80 88                   AM
0C81 88                   AM
0C82 2555                 CI     H'55'
0C84 8407   0C8C          BZ     CHK7
0C86 71                   LIS    1
0C87 FC                   NS     S         BAD CHECKSUM HERE
0C88 94C8   0C51          BNZ    CHK8
0C8A 90D2   0C5D          BR     CHK4
0C8C 02           CHK7    LR     A,QU
0C8D 1F                   INC
0C8E 2509                 CI     9
0C90 82E1   0C72          BC     CHK9
0C92 71                   LIS    1
0C93 FC                   NS     S
0C94 94D7   0C6C          BNZ    CHK13
0C96 290092 0092          JMP    MCRET     DONE
                  *
0C99 08           DISOUT  LR     K,P
0C9A 63                   LISU   3
0C9B 6F                   LISL   7
0C9C 78           DIS2    LIS    8
0C9D 52                   LR     2,A
0C9E 70                   CLR
0C9F 1A                   DI
0CA0 B4                   OUTS   4
0CA1 A0                   INS    0
0CA2 2104                 NI     4
0CA4 50                   LR     0,A
0CA5 2280                 OI     H'80'
0CA7 51                   LR     1,A
0CA8 70           DIS1    CLR
0CA9 CC                   AS     S
0CAA 40                   LR     A,0
0CAB 9102   0CAE          BM     *+3
0CAD 41                   LR     A,1
0CAE B0                   OUTS   0
0CAF 71                   LIS    1
```

```
0CB0 B4                      OUTS  4
0CB1 70                      CLR
0CB2 B4                      OUTS  4
0CB3 4C                      LR    A,S
0CB4 13                      SL    1
0CB5 5C                      LR    S,A
0CB6 32                      DS    2
0CB7 94F0   0CA8             BNZ   DIS1
0CB9 40                      LR    A,0
0CBA B0                      OUTS  0
0CBB 1B                      EI
0CBC 4E                      LR    A,D
0CBD 8FDE   0C9C             BR7   DIS2
0CBF 0C                      PK
                   *
0CC0 08            DISCLR    LR    K,P      CLEAR DISP REGISTERS
0CC1 63                      LISU  3
0CC2 6F                      LISL  7
0CC3 70                      CLR
0CC4 5E            DSC1      LR    D,A
0CC5 8FFE   0CC4             BR7   DSC1
0CC7 0C                      PK
                   *
0CC8 08            LDMSG     LR    K,P
0CC9 63                      LISU  3
0CCA 6B                      LISL  3
0CCB 16            LDM1      LM
0CCC 5E                      LR    D,A      LOAD MESSAGE FROM ROM
0CCD 8FFD   0CCB             BR7   LDM1
0CCF 0C                      PK
                   *
0CD0 08            MDTMCD    LR    K,P
0CD1 69                      LISL  1
0CD2 63            MDT1      LISU  3
0CD3 4C                      LR    A,S
0CD4 67                      LISU  7
0CD5 5E                      LR    D,A
0CD6 8FFB   0CD2             BR7   MDT1
0CD8 0C                      PK
                   *
0CD9 08            LDFUD     LR    K,P
0CDA A5                      INS   5        LOAD CORR FACTOR
0CDB 13                      SL    1
0CDC 8103   0CE0             BP    LDE1     E/M
0CDE 72                      LIS   2        2 BYTES EACH
0CDF 8E                      ADC
0CE0 67            LDE1      LISU  7
0CE1 6A                      LISL  2
0CE2 16                      LM
0CE3 5D                      LR    I,A
0CE4 16                      LM
0CE5 5C                      LR    S,A
0CE6 0C                      PK
                   *
0CE7 08            LDEFUD    LR    K,P      LIKE ABOVE, BUT
0CE8 A5                      INS   5         WITH EXP SHIFT
0CE9 13                      SL    1
0CEA 8103   0CEE             BP    LDE2
0CEC 73                      LIS   3
0CED 8E                      ADC
0CEE 66            LDE2      LISU  6
0CEF 68                      LISL  0
0CF0 4C                      LR    A,S
0CF1 88                      AM
0CF2 5C                      LR    S,A
0CF3 90EC   0CE0             BR    LDE1
                   *
0CF5 08            LD1FFE    LR    K,P      LIKE ABOVE, NO E/M
0CF6 90F7   0CEE             BR    LDE2
                   *
```

```
0CF8 08              CKST    LR    K,P      STORE VALUE W/CHECKSUM
0CF9 65                      LISU  5
0CFA 68                      LISL  0
0CFB 4D                      LR    A,I
0CFC CC                      AS    S
0CFD 18                      COM
0CFE 2456                    AI    H'56'
0D00 52                      LR    2,A
0D01 1A                      DI             NO INTERRUPT WHEN STORING
0D02 4E                      LR    A,D
0D03 17                      ST
0D04 4C                      LR    A,S
0D05 17                      ST
0D06 42                      LR    A,2
0D07 17                      ST
0D08 1B                      EI
0D09 0C                      PK
                     *
0D0A 08              ADAREA  LR    K,P
0D0B 42                      LR    A,2      ADD R2 TO AREA ACC IN RAM
0D0C 2466                    AI    H'66'
0D0E 89                      AMD
0D0F 52                      LR    2,A
0D10 2066                    LI    H'66'
0D12 19                      LNK
0D13 89                      AMD
0D14 53                      LR    3,A
0D15 20FE                    LI    -2
0D17 8E                      ADC
0D18 42                      LR    A,2
0D19 1A                      DI             NO INT WHEN STORING
0D1A 17                      ST
0D1B 43                      LR    A,3
0D1C 17                      ST
0D1D C2                      AS    2
0D1E 18                      COM
0D1F 2456                    AI    H'56'
0D21 17                      ST
0D22 1B                      EI
0D23 0C                      PK
                     *
0D24 08              CMPR    LR    K,P
0D25 16                      LM
0D26 18                      COM
0D27 1F                      INC
0D28 8202       0D2B         BC    *+3
0D2A C2                      AS    2        SUBTRACT # IN RAM
0D2B 70                      CLR             FROM R2,R3
0D2C 19                      LNK            RETURN C,NC
0D2D 54                      LR    4,A
0D2E 16                      LM
0D2F 18                      COM
0D30 C4                      AS    4
0D31 8202       0D34         BC    CMP1
0D33 C3                      AS    3
0D34 0C              CMP1    PK
                     *
0D35 08              SHRT    LR    K,P
0D36 16                      LM             SHIFT BYTE AT DC0 RIGHT
0D37 52                      LR    2,A
0D38 12                      SR    1
0D39 C3                      AS    3        ROTATE LSB THROUGH R3
0D3A 53                      LR    3,A
0D3B 20FF                    LI    -1
0D3D 8E                      ADC
0D3E 43                      LR    A,3
0D3F 17                      ST
0D40 42                      LR    A,2
0D41 15                      SL    4
0D42 12                      SR    1
```

```
0D43 15                  SL    4
0D44 53                  LR    3,A
0D45 0C                  PK
                 *
0D46 08          CKSM5   LR    K,P          DO CHECKSUM ON 5 DIGITS
0D47 16                  LM
0D48 88                  AM
0D49 88                  AM
0D4A 2555                CI    H'55'
0D4C 0C                  PK
                 *
0D4D 08          LBLON   LR    K,P          TURN ON LABEL
0D4E 46                  LR    A,6          # IN R6
0D4F 13                  SL    1
0D50 2A0D9B 0D9B         DCI   MTABLE
0D53 8E                  ADC
0D54 16                  LM
0D55 0B                  LR    IS,A
0D56 4C                  LR    A,S
0D57 8B                  OM
0D58 5C                  LR    S,A
0D59 0C                  PK
                 *
0D5A 08          DECODE  LR    K,P          DIGIT -> 7 SEG CODE
0D5B 42          DECO1   LR    A,2
0D5C 2A0D90 0D90 DECO2   DCI   SEGTBL
0D5F 63                  LISU  3
0D60 8E                  ADC
0D61 4C                  LR    A,S
0D62 8B                  OM
0D63 5C                  LR    S,A
0D64 0C                  PK
                 *
0D65 08          NUMOUT  LR    K,P          OUTPUT NUMBER WITH LZB
0D66 7C                  LIS   H'C'
0D67 F3                  NS    3
0D68 84F2   0D5B         BZ    DECO1
0D6A 70                  CLR
0D6B C2                  AS    2
0D6C 9408   0D75         BNZ   NUM2
0D6E 20FC                LI    -4
0D70 C3                  AS    3
0D71 53                  LR    3,A
0D72 7A                  LIS   10
0D73 90E8   0D5C         BR    DECO2
0D75 20F3        NUM2    LI    H'F3'
0D77 F3                  NS    3
0D78 53                  LR    3,A
0D79 90E1   0D5B         BR    DECO1
                 *
                 *
0D7B 00090F      VTABLE  DC    H'00090F0C00001B'     RAM LOCATIONS OF
0D82 181512              DC    H'181512000306'       PROG,ALARM VALUE
                 *
0D88 1E041E      CURSTB  DC    H'1E041E011D101D04'   ISAR,BIT FOR CUR
                 *
0D90 3F065B      SEGTBL  DC    H'3F065B4F66'         SEG CODES FOR 0-
0D95 6D7D07              DC    H'6D7D077F6F00'
                 *
0D9B 1F101F      MTABLE  DC    H'1F101F081F041F02'   LOC FOR LABELS,M
0DA3 00001E              DC    H'00001E401EC01E10'    ISAR, BIT
0DAB 1E201A              DC    H'1E201A801F01'
0DB1 1B801C              DC    H'1B801C80'
                 *
0DB5 3ACC3C      LTABLE  DC    H'3ACC3C883E990C69'   DISPLAY VALUE TA
0DBD 000038              DC    H'00003899369918CC'   1ST BYTE RAM OFF
0DC5 159912              DC    H'15991288'           2ND BYTE DP,LZB
0DC9 3ACC09              DC    H'3ACC09000F000C21'   METRIC, THEN ENG
0DD1 000000              DC    H'0000000036111800'   FIRST 20 OPERATE
0DD9 151112              DC    H'15111200'           NEXT 20 PROGRAM
```

```
0DDD 008803   2520          DC    H'008803000655'     LAST 6 ALARM
              2521   *
0DE3 6D7439   2522   MSSHCR DC    H'6D743950'     "SHCR"
0DE7 00545C   2523   MSNO   DC    H'00545C00'     "NO"
0DEB 717730   2524   MSFAIL DC    H'71773038'     "FAIL"
0DEF 404040   2525   MSDASH DC    H'40404040'     "----"
              2526   *
0DF3 08FAE1   2527   ARFUD  DC    H'08FAE10506F0'     CORR FACTOR FOR ARE
              2528   *
0DF9 0040FA   2529   SPFUD  DC    H'0040FA66'     CORR FACTOR FOR GND
              2530   *
0DFD 02B0EA   2531   DSTFUD DC    H'02B0EA010F8F'     CORR FACTOR FOR DIS
              2532   *
0E03 9D2A6C   2533   DCLFUD DC    H'9D2A6C34'     CORR FACTOR FOR DIS
              2534   *
0E07 0300B4   2535   ARATFD DC    H'0300B4'     CORR FACTOR FOR AVG
              2536   *
0E0A FE00B4   2537   CRATFD DC    H'FE00B4'     CORR FACTOR FOR CUR
              2538   *
0E0D F400C8   2539   SLPFUD DC    H'F400C8'     CORR FACTOR FOR SLI
              2540   *
              2541   *
0E10 E803     2542   HXCNV  DC    H'E803'
0E12 6400     2543          DC    H'6400'
0E14 0A00     2544          DC    H'0A00'
              2545   *
0E16 1D1B18   2546   SLPTB  DC    H'1D1B18161311'
0E1C 0E0C09   2547          DC    H'0E0C09070402'
              2548   *
              2549   *
              2550          END
ERRS
```

While the invention has been illustrated and described herein with reference to a preferred embodiment, the invention is not limited thereto. Rather, the invention is intended to include such alternatives, changes and modifications as may become apparent to those skilled in the art upon reading the foregoing descriptions, insofar such changes, alternatives and modifications are included within the spirit and scope of the appended claims.

The invention is claimed as follows:

1. A monitoring apparatus for a vehicle including a plurality of sensors for detecting a plurality of vehicle functions and conditions and for producing corresponding sensor signals, said monitoring apparatus comprising: a console including operator actuatable control means, and control circuit means including means for calculating wheel slippage of at least one drive wheel of said vehicle, said calculating means including means responsive to sensor signals corresponding to the ground speed of said vehicle and to sensor signals corresponding in a predetermined fashion to the rotational speed of said at least one drive wheel for calculating a predetermined relationship therebetween; and said control circuit means including recording means responsive to actuation of said operator actuatable control means for recording said calculated relationship as a reference value when said vehicle is being operated under conditions where there is substantially no slippage of said drive wheel, thereby calibrating said calculating means to calculate wheel slippage in response to said sensor signals corresponding to ground speed and to rotational speed and in accordance with said reference value.

2. Apparatus according to claim 1 and further including observable indicator means responsive to said calculating means for producing an observable indication of wheel slippage.

3. Apparatus according to claim 2 wherein said calculating means further includes means for calculating wheel slippage as a percentage value and wherein said display includes visual display means for producing a visual analog of said calculated percentage value.

4. Apparatus according to claim 2 wherein said calculating means further includes means for producing an indicator control signal in response to said calculated wheel slippage being in excess of a preselected amount of wheel slippage and wherein said observable indicator means includes alarm means responsive to said indicator control signal for producing an observable alarm indication.

5. Apparatus according to claim 4 wherein said operator actuatable control means includes means for selecting said preselected amount of wheel slippage.

6. Apparatus according to claim 4 wherein said alarm means includes audible alarm means.

7. Apparatus according to claim 4 or claim 6 wherein said alarm means includes visual alarm means.

8. Apparatus according to claim 2 wherein said calculating means is further responsive to sensor signals corresponding to vehicle ground speed for calculating vehicle ground speed, and means for producing an indicator control signal for actuating said observable indicator means in response to said calculated ground speed being in excess of a preselected ground speed.

9. Apparatus according to claim 16 wherein said calculating means is further responsive to sensor signals corresponding to the rotational speed of the vehicle engine for calculating the value of the rotational speed of said vehicle engine and means for producing an indicator control signal for energizing said observable indicator means in response to said calculated rotational speed being less than a preselected minimum rotational speed.

10. Apparatus according to claim 2 wherein said observable indicator means comprises audible alarm means.

11. Apparatus according to claim 10 wherein said observable indicator means includes visual alarm means.

12. Apparatus according to claim 8 wherein said operator actuable control means includes means for selecting said preselected ground speed.

13. Apparatus according to claim 9 wherein said operator actuatable control means includes means for selecting said preselected minimum rotational speed.

14. A monitoring apparatus for a vehicle including a plurality of sensors for detecting a plurality of vehicle functions and conditions and for producing corresponding sensor signals, said monitoring apparatus comprising: a console including operator actuatable control means, and control circuit means including means for calculating wheel slippage of at least one drive wheel of said vehicle, said calculating means including means responsive to sensor signals corresponding to engine RPM of said vehicle and to sensor signals corresponding to the ground speed of said vehicle for calculating a predetermined relationship therebetween and said control circuit means including recording means responsive to actuation of said operator actuatable control means for recording said calculated relationship as a reference value when said vehicle is being operated under conditions where there is substantially no slippage of said drive wheel in each of a plurality of ranges of gear ratios of said vehicle, thereby calibrating said calculating means to calculate wheel slippage for each of said plurality of ranges of gear ratios in response to said sensor signals corresponding to ground speed and engine RPM and in accordance with the corresponding reference value.

15. Apparatus according to claim 14 wherein said calculating means further includes means for calculating wheel slippage for each of said ranges of gear ratios selected in response to actuation of said operator actuatable control means, and display means responsive to said calculated wheel slippage for producing an observable indication of the calculated wheel slippage and of the selected range of gear ratios.

16. Apparatus according to claim 1 wherein said sensor signals corresponding in a predetermined fashion to the rotational speed of said at least one drive wheel comprise sensor signals corresponding to the engine RPM of the vehicle, and wherein said calculating means is responsive to said sensor signals corresponding to engine RPM in each of a plurality of ranges of gear ratios of said vehicle for calculating said predetermined relationship between engine RPM and ground speed for each of said plurality of ranges of gear ratios; and wherein said recording means is further operative for setting in each of said calculated relationship as a reference value for an associated range of gear ratios.

17. Apparatus according to claim 16 wherein said control circuit means further includes means responsive to presence of a rotational speed sensor other than said engine RPM sensor for causing said calculating means and said recording means to calculate and record a single reference value, and responsive to absence of a rotational speed sensor other than said engine RPM sensor for causing said calculating means/and recording means to respond to given actuations of said operator actuatable control means for calculating and recording a reference value for each of said plurality of ranges of gear ratios of said vehicle.

* * * * *